(12) United States Patent
Dean

(10) Patent No.: US 6,442,848 B1
(45) Date of Patent: Sep. 3, 2002

(54) COPING SAW

(76) Inventor: Ethan Dean, 9779 Fairway Dr., Pinckney, MI (US) 48169

( * ) Notice: Subject to any disclaimer, the term of this patent is extended or adjusted under 35 U.S.C. 154(b) by 0 days.

(21) Appl. No.: 09/531,923

(22) Filed: Mar. 21, 2000

Related U.S. Application Data

(60) Provisional application No. 60/125,662, filed on Mar. 22, 1999.

(51) Int. Cl.[7] .............................................. B23D 53/12
(52) U.S. Cl. ......................................................... 30/380
(58) Field of Search .............................. 30/380; 83/816, 83/820; 474/178, 191

(56) References Cited

U.S. PATENT DOCUMENTS

| | | | |
|---|---|---|---|
| 1,453,335 A | | 5/1923 | Bennett |
| 1,955,063 A | | 4/1934 | Greitzer |
| 2,596,081 A | | 5/1952 | Sacrey |
| 3,621,894 A | | 11/1971 | Niksich |
| 3,829,970 A | * | 8/1974 | Anderson ..................... 30/380 |
| 4,001,937 A | * | 1/1977 | Stelljes et al. ................. 30/380 |
| 4,160,320 A | | 7/1979 | Wikoff |
| 4,193,192 A | | 3/1980 | Cortez |
| 4,242,798 A | | 1/1981 | Wikoff |
| 4,413,414 A | | 11/1983 | Strzalka |
| 4,449,271 A | | 5/1984 | Karubian |
| 4,465,161 A | * | 8/1984 | Ohta et al. .............. 474/178 X |
| 4,576,077 A | * | 3/1986 | Titus ............................. 83/816 |
| 4,700,702 A | | 10/1987 | Nilsson |
| 5,220,729 A | | 6/1993 | Gallant |
| 5,363,558 A | | 11/1994 | Schroeder |
| 5,388,334 A | | 2/1995 | Halsey |

\* cited by examiner

*Primary Examiner*—Douglas D. Watts
(74) *Attorney, Agent, or Firm*—Barry C. Kane; Miller, Johnson, Snell & Cummiskey, P.L.C.

(57) ABSTRACT

A coping saw is provided having two spaced-apart rotary actuators supported by a frame. Two saw-blade sections extend between the two rotary actuators and are intended to singularly engage a work piece. The saw is adapted to contain a drive mechanism which is coupled to a first of the two rotary actuators for causing the saw-blade sections to move in at least one direction. Alternately, the coping saw may be configured to be an attachment for a conventional rotary tool.

64 Claims, 13 Drawing Sheets

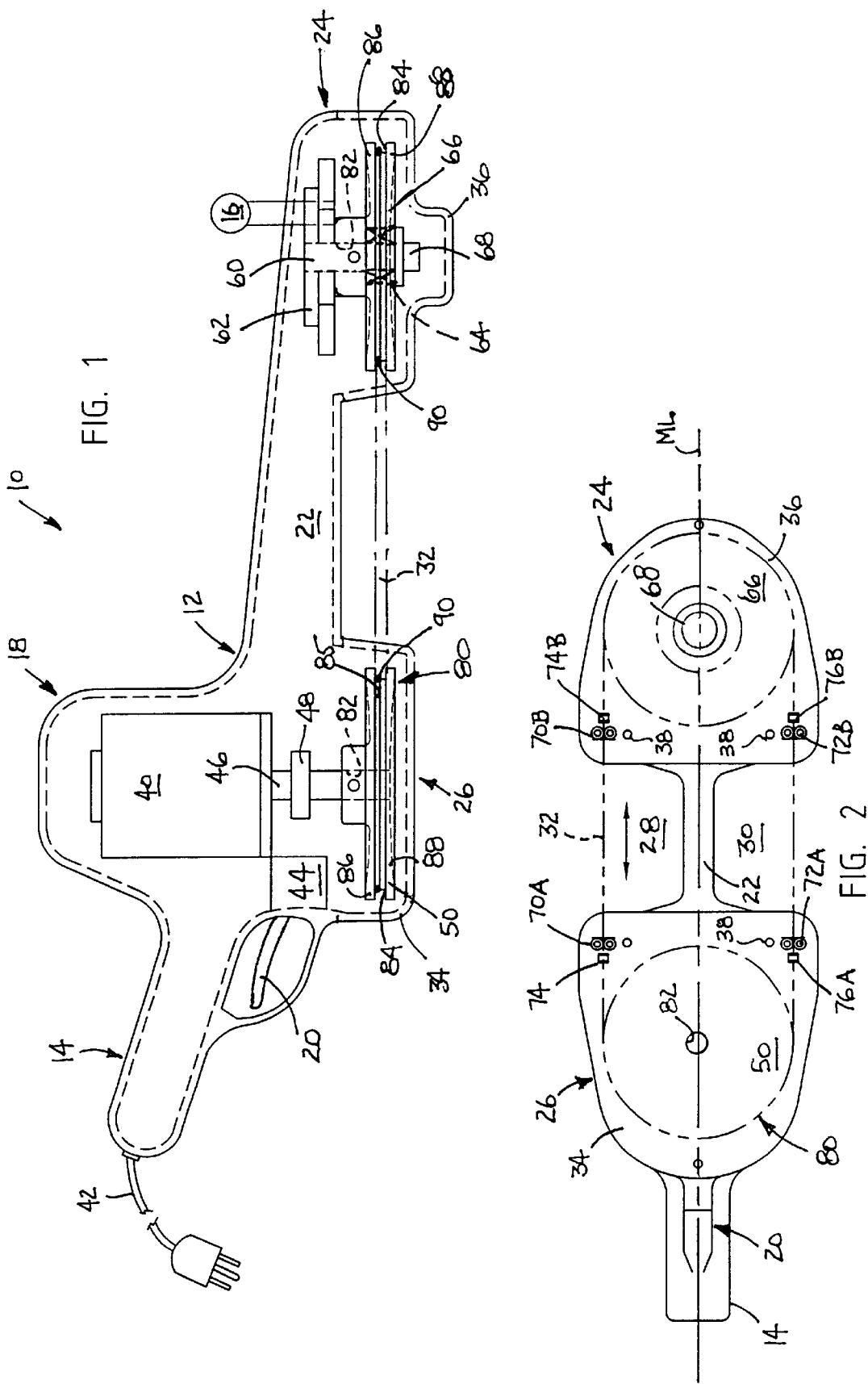

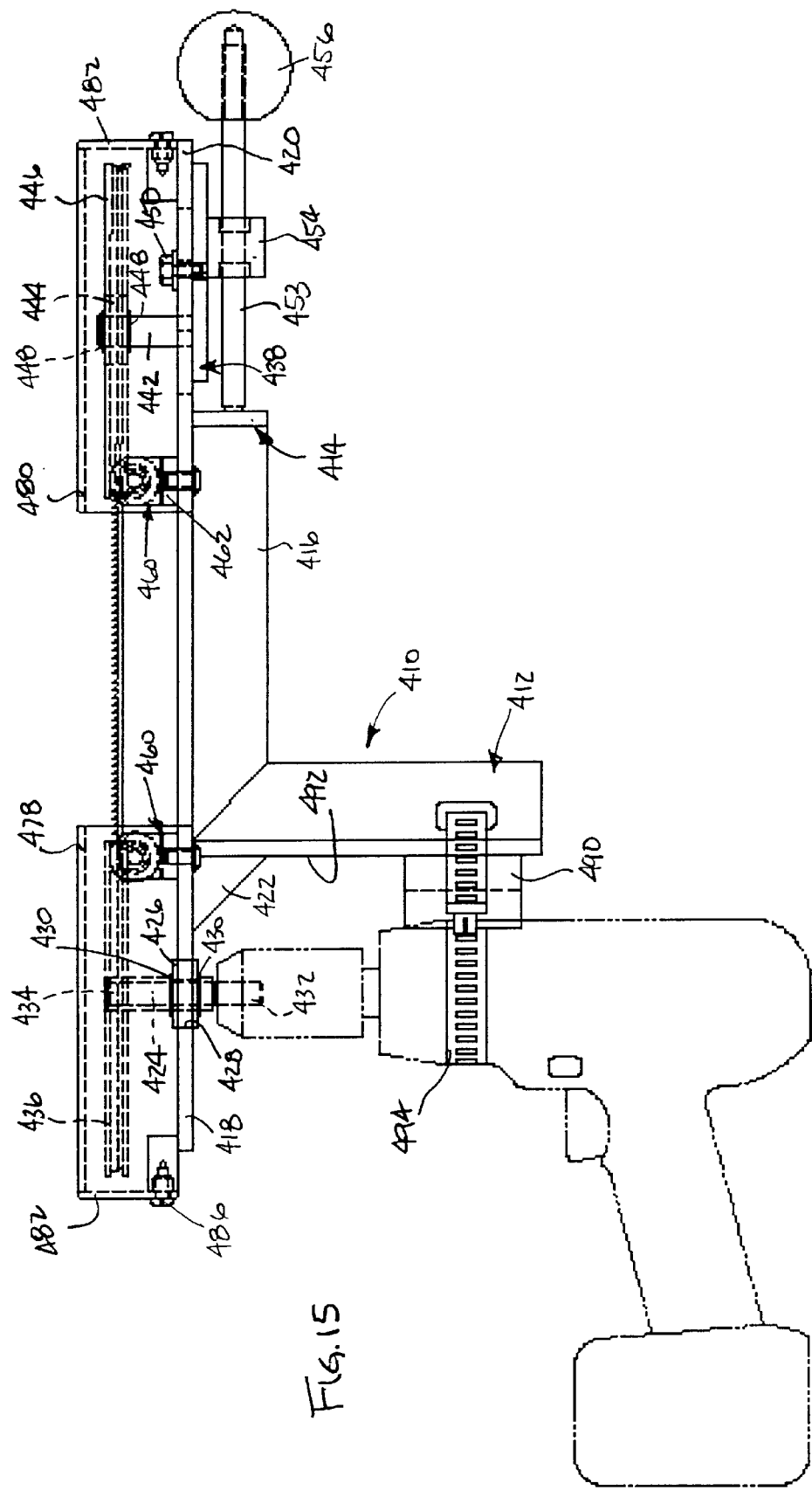

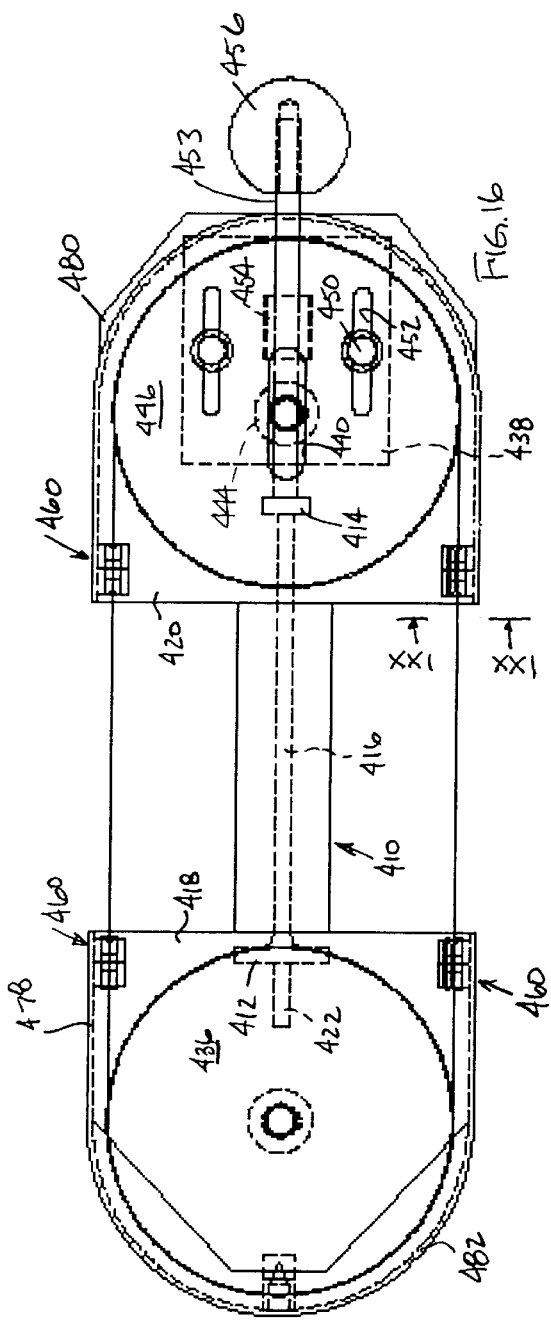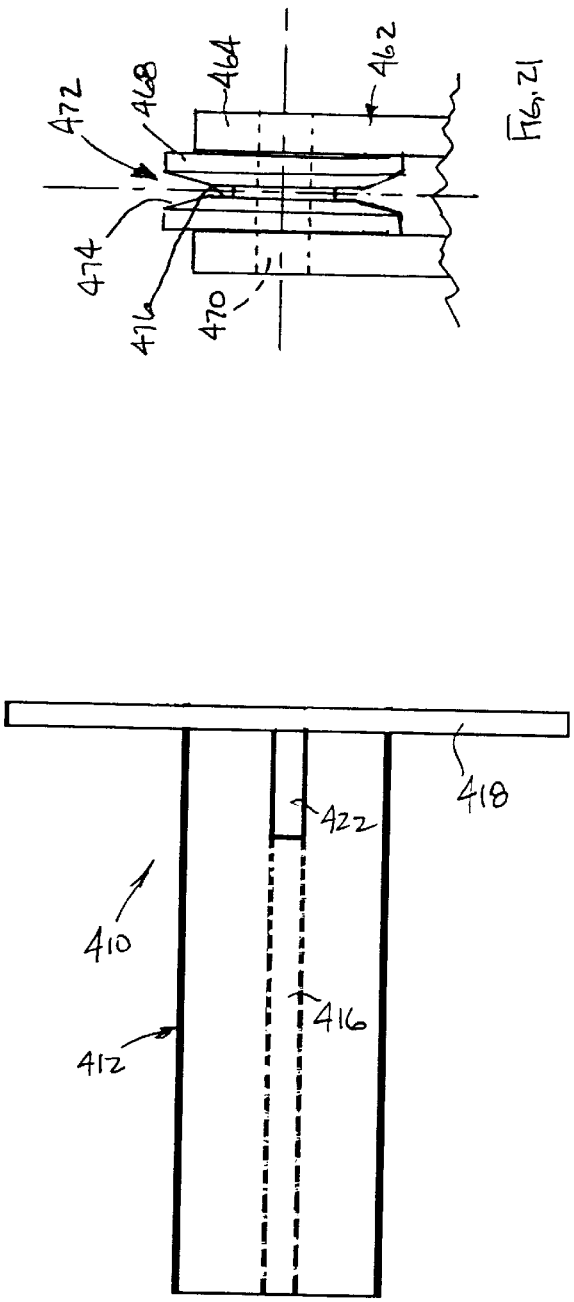

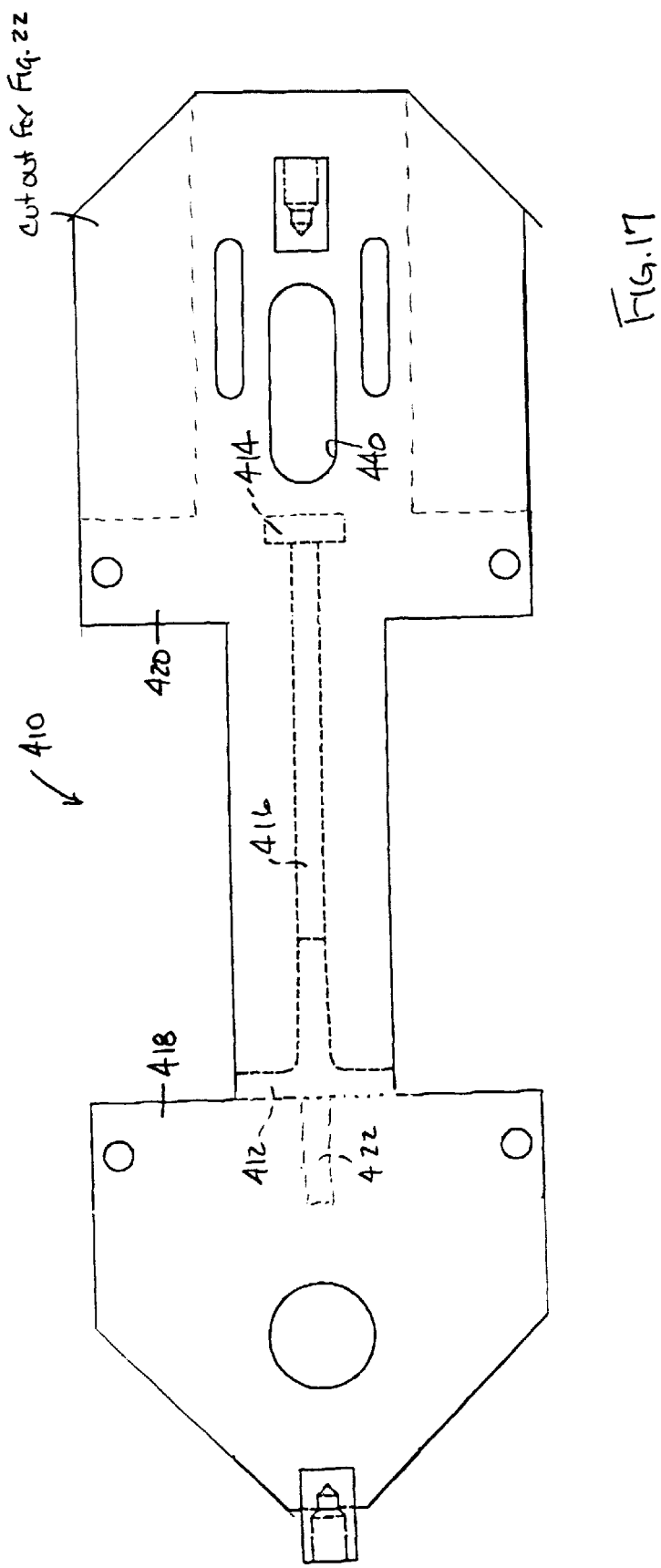

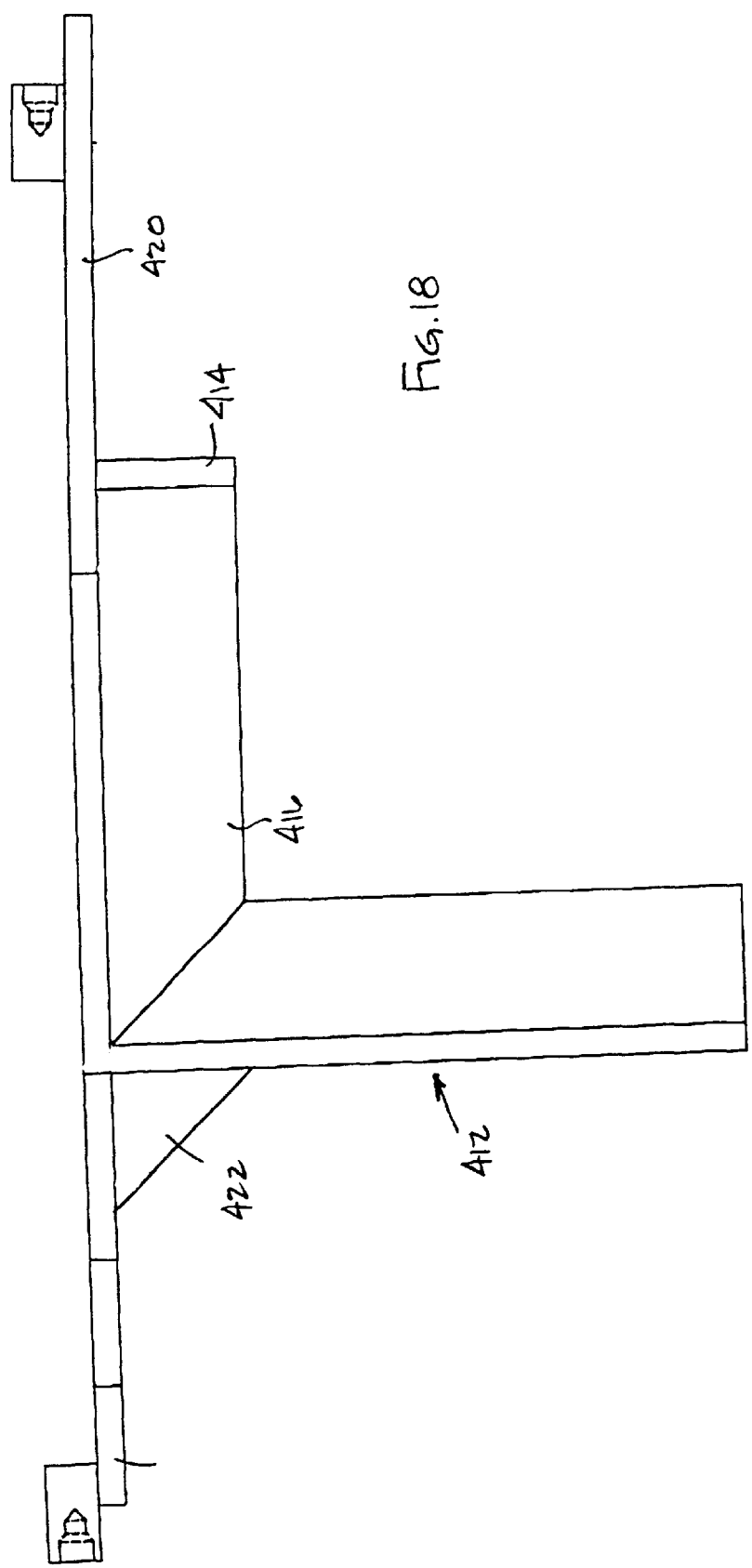

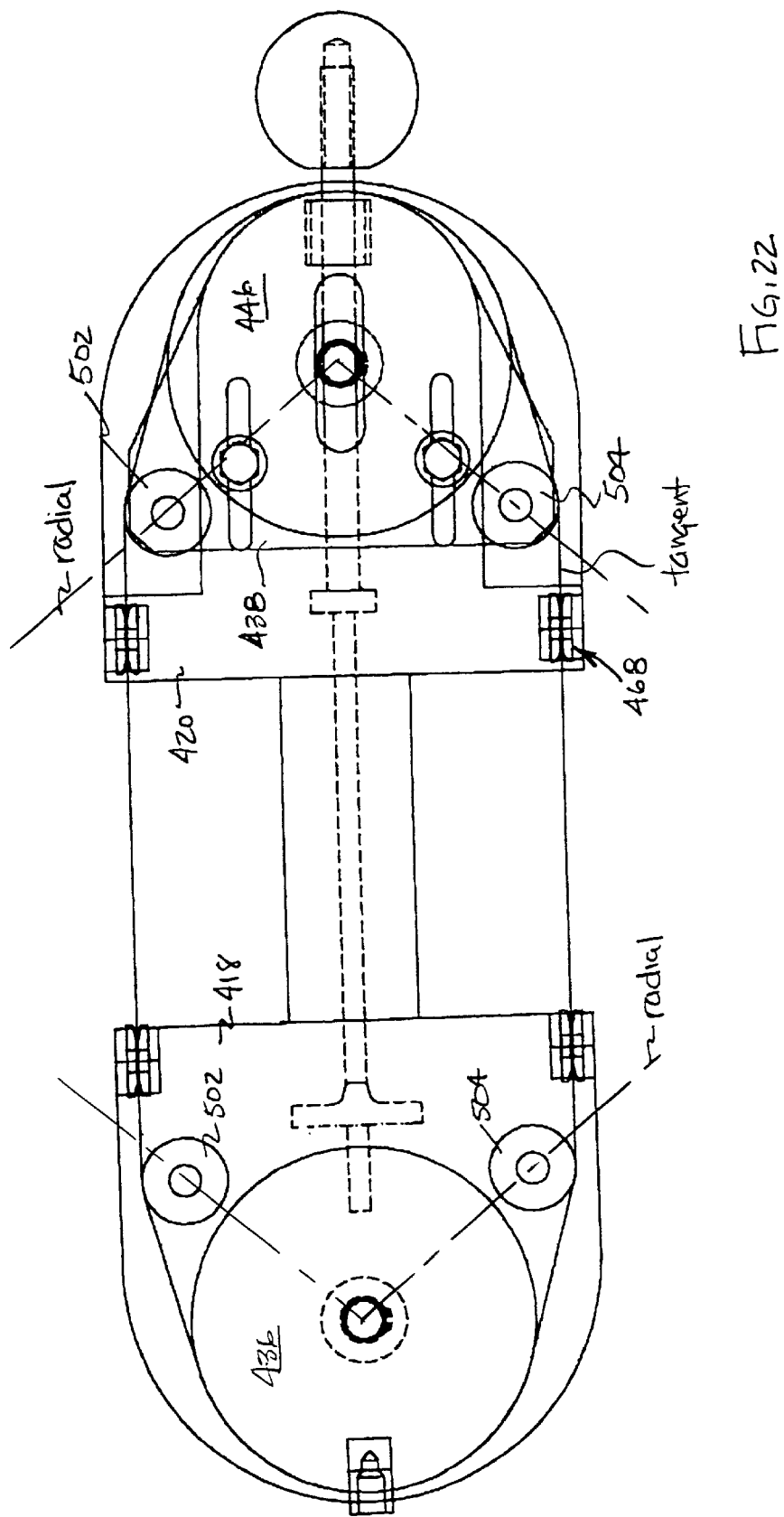

COPING SAW

CROSS REFERENCE TO RELATED APPLICATIONS

This application claims priority from United States provisional patent application serial No. 60/125,662, filed Mar. 22, 1999, the contents of which are incorporated herein by reference.

BACKGROUND OF THE INVENTION

This invention relates generally to cutting tools such as saws, and more particularly to a mechanized or powered coping saw assembly.

BRIEF DESCRIPTION OF THE RELATED ART

Carpenters have traditionally used coping saws to cut joints between crown moulding, chair rails, and loose board moulding. A traditional coping saw is a hand saw having a narrow fixed blade held under tension in a generally square-shaped frame. The square-shaped frame provides considerable clearance relative to the fixed saw blade to cut curves or sharp angled cuts in wood and other products. Sawing with a traditional coping saw can be slow, arduous, and labor intensive depending on the scope of the project. The operator saws back and forth monitoring the blade is following the desired curve necessary to make the joints.

To expedite the coping process, others have attempted to mechanize the tool and others have described the concept of powering the coping saw. For example, refer to U.S. Pat. Nos. 5,388,334; 5,363,558; 5,220,729; 3,621,894 and 1,955,063. Problems exist with substantially all of the foregoing designs. Perhaps the most important disadvantage associated with the prior saws is that they fail to take into account how coping saws are used by the operator. Traditionally, manual coping saws are used to cut complicated curves and profiles. The operator cuts along a first line, backs out, and then approaches the cut from a different angle. The prior powered coping saws made it difficult for the operator to readily back out of the cut and reposition the saw for the different angle. More importantly, the prior saws were clumsy and cumbersome designs requiring the operator to perform athletic maneuvers to position the saw for the right cut. In versions where the blade reciprocated, it was difficult to maintain the position of the saw because the force generated by the blade would tend to make the saw chatter and move the operators hand rather than the blade through the workpiece. In substantially all of the prior power coping saw designs, the drive and track systems were complicated and expensive to manufacture. The instant invention provides a solution to substantially all of the difficulties presented by the prior devices, in that it is easy for the operator to grip and maneuver for different cuts, it is mechanically easy to build, and relatively inexpensive to manufacture.

SUMMARY OF THE INVENTION

The instant invention is a unique mechanized coping saw which provides maximum flexibility to quickly, easily, and accurately cut (cope) a workpiece such as a piece of moulding. In general, the instant invention provides a continuous loop blade disposed between two pulleys or rotary actuators which provide two generally parallel and spaced apart saw blade cutting sections, each traveling in an opposite direction of the other so the user can select the best cutting direction and angle to complete the cut. The instant invention also provides a unique system for retaining the blade on the two pulleys, resulting in a more accurate and reliable blade.

In one form of the invention, the mechanized coping saw includes a frame internal to a housing which supports a drive pulley at one end, and a driven pulley at an opposite end. The frame is shaped such that a bridge defines a gap or space between the two pulleys. A continuous loop blade is mounted on the two pulleys such that two segments or portions span the gap between the pulleys, both blades available to cut the work piece at the election of the operator.

In another form of the invention, the mechanized saw comprises a housing which provides the framework and support for a drive pulley and a driven pulley. The continuous loop blade is mounted at least partially circumferentially around the spaced-apart drive pulley and driven pulley. The drive and driven pulleys each having a circumferential groove for partially receiving a polymeric O-ring or band used to provide traction and tracking of the continuous loop blade around the pulleys.

In another form of the invention, the housing containing the saw provides an opening or work space intermediate the first and the second ends of the housing. It is across this opening that the two continuous blade sections traverse between the two pulleys, providing two cutting sections of blade moving in opposite directions. The availability of the two cutting sections moving in opposite directions provides the operator greater flexibility in cutting options to cope a desired profile.

In yet another form of the invention, the mechanized saw includes a housing having a first and second spaced-apart end portions interconnected by a bridge which defines a C-shaped transverse channel extending between the first and second end portions. The first and second end portions and the bridge are aligned along a first plane of symmetry which includes a longitudinal axis for the housing. A motor is provided in the first end portion of the housing and has a shaft extending from at least one end thereof, the longitudinal axis of which is contained in the first plane of symmetry. A drive pulley is provided in the first end portion of the housing and mounted to the free end of the shaft extending from the motor. The drive pulley is oriented such that it is contained in a plane of symmetry different from, and preferably perpendicular to, the first plane. A carriage is provided in the second end portion of the housing and is configured to be movable between a first and a second position. A driven pulley is mounted on the carriage such that the drive pulley and the driven pulley are approximately contained in the same plane of symmetry. A continuous loop blade is then mounted on the drive pulley and the driven pulley such that first and second sections of the blade span the C-shaped channel at spaced-apart locations. Blade guides are provided in the housing adjacent the transverse channel to provide lateral stiffness and stability to the two blade sections. The drive and driven pulleys rotate the blade, where a first section of the blade moves in one direction opposite to that of the second section of the blade such that both sections of the blade provide opposite cutting actions.

In a further form of the invention, the drive pulley and the driven pulley are slightly misaligned or offset from the second plane of symmetry to assist in tracking and/or retaining the continuous loop blade on the two pulleys. The resulting arrangement of the two offset pulleys, in effect creates a bisected hyperbola which, upon rotation, assists in the tracking of the continuous loop blade on the two pulleys.

In order to get another form of the invention, the drive pulley and driven pulley are mounted on frame by one or more bearings. At least one, and preferably the driven pulley is mounted to an adjustable carriage which in turn is fixed to the frame-adjustment being provided by a threaded member. The drive pulley includes a shaft extending therefrom which is receivable in a chuck of a power tool selectively coupled and uncoupled with respect to the frame. In this fashion the invention could be in the form of attachment for a conventional power tool such as drill. In still a further embodiment of the invention, outrigger and guide rollers would be disposed intermediate the drive pulley and the driven pulley to improve tracking of the continuous loop blade about the pulleys, and to increase blade life as the blade does not encounter a rapid bending moment produced by the radius of the pulley. Rather the outrigger rollers provide a gradual feed to the drive and driven pulleys.

In one other form of the invention, the body or housing for the saw may be laterally offset such that the depth of the C-shaped work area is increased. However, in this embodiment, it is envisioned that the lateral offset of the housing will enclose one of the two exposed blade segments. In this configuration, although the parts and components are substantially similar, one of the blades is within the housing, providing a powerized skiving saw or draw saw.

The instant mechanism described and claimed herein provides the woodworker substantial artistic flexibility and reliability in a powerized saw. Two saw-blade sections, rather than one saw blade, are provided which travel in opposite directions so that the operator may elect to cut in one or the other direction to complete a complex cope. Additionally, substantial strength and alignment is provided to the blades by guide and support bearings located immediately adjacent the C-shaped channel and on either side of the blade. Together with the guide bearings, the two blade segments are adequate to cut soft and hard woods alike in a fraction of the time of conventional coping saws.

These and other features, advantages and objects of the present invention will be further understood and appreciated by those skilled in the art by reference to the following specification, claims and appended drawings.

BRIEF DESCRIPTION OF THE DRAWINGS

FIG. 1 is an elevational cross-sectional view of one embodiment of a powered coping saw;

FIG. 2 is a bottom plan view of the invention shown in FIG. 1.

FIG. 15 is a side elevation view of yet another embodiment of the invention;

FIG. 16 is a bottom view of the invention shown in FIG. 15;

FIG. 17 is a bottom plan view of frame weldment for the invention shown in FIG. 15;

FIG. 18 is a side elevation view of the frame weldment;

FIG. 19 is an end elevation view of the frame weldment;

FIG. 21 is a fragmentary section view of a guide roller taken along line XXI—XXI shown in FIG. 16;

FIG. 22 is a schematic diagram of the instant invention having rollers intermediate each pulley and the guide rollers.

DETAILED DESCRIPTION OF PREFERRED EMBODIMENTS

Figure 3:
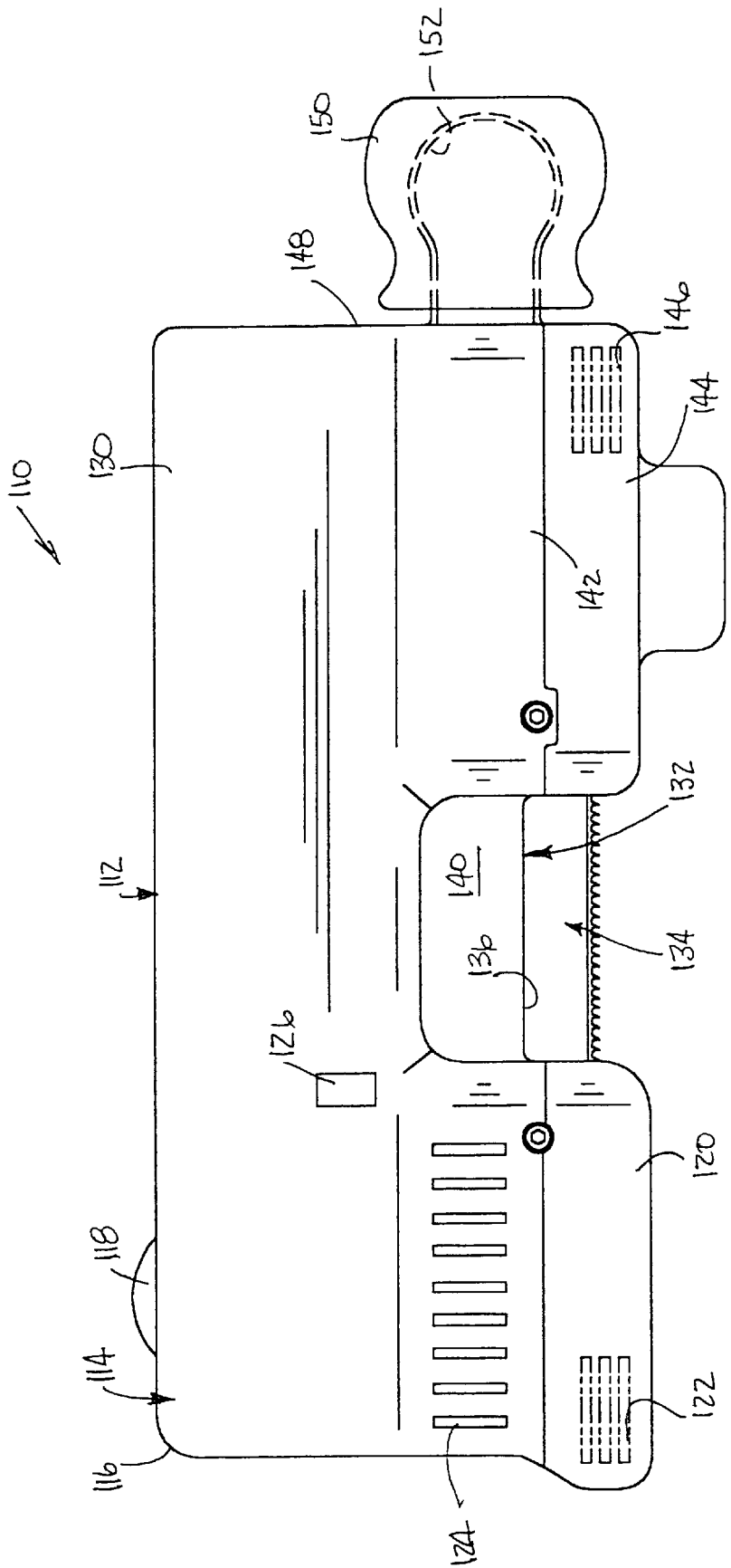
FIG. 3 is a side elevation view of another embodiment of the invention.

For purposes of the following description, the terms "upper," "lower," "left," "rear," "front," "vertical," "horizontal" and derivatives of such terms shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Specific dimensions and other physical characteristics relating to the embodiments disclosed herein are not to be considered limiting, unless the claims expressly state otherwise. It is also understood that the terms wheel, pulley, or rotary actuator are used interchangeably and refer to components which have a rotary motion, full or partial, to produce or impart a linear motion of an associated or connected component.

The instant invention is a powered, hand-held saw for cutting a work piece, including in combination a housing having an intermediate opening separating a first and a second end portions. A drive pulley is mounted in the first end portion of the housing while a driven pulley is mounted in the second end portion. A continuous loop blade extends at least partially around the drive pulley and the driven pulley such that two segments extend across the intermediate opening to provide two exposed sections of the continuous loop blade for cutting the workpiece.

In other form of the invention, the powered hand-held saw includes a continuous loop blade mounted at least partially circumferentially around a spaced-apart drive pulley and a driven pulley, the drive pulley and the driven pulley each having a circumscribing groove retaining an o-ring for providing proper tracking of the continuous loop blade along the drive and driven pulleys, and to provide traction to the continuous loop blade on the drive pulley.

Referring to drawing FIGS. 1 and 2, one embodiment of the power coping saw 10 comprising the invention includes a housing 12 preferably formed from injection molded, high impact plastic. Housing 12 may be formed with a plurality of internal bulkheads to provide rigidity and to provide mounting structures or support for the internal components. In the embodiment shown, housing 12 includes a primary handle 14 extending from one end of the housing and a support handle 16 disposed at an opposite end. The support handle 16 may include a secondary function of an adjustment handle for loosening and tightening the saw blade as described in greater detail below. As reflected in FIG. 1, the housing 12 slopes upwardly from support handle 16 toward the primary handle 14, interrupted by an enlarged portion 18 configured to accommodate a motor described in greater detail below. Disposed below the handle 14 may be a trigger assembly 20 for controlling the operation of the saw assembly.

Referring to FIG. 2, the housing 12 is unique in that it includes a bridge 22 interconnecting a front portion 24 to a rear portion 26 proximate handle 14. Bridge 22 provides clearance for the workpiece being cut, and particular, defines work areas 28 and 30 across which continuous loop blade 32 spans. As briefly mentioned above, housing 12 may contain a motor 40 such as a variable speed, geared motor, for rotating the continuous loop blade 32. Motor 40 may be anyone of a number of different motors available from a wide range of manufactures. For example, it is contemplated that motor 40 may be an A/C, 15 amp electric motor used in other power tool applications. Power to the motor may be provided through a plug and cord 42 operably interconnected by a switch assembly 44. Alternatively, motor 40 may be of the type to receive direct current from one or more batteries (not shown) which may be disposed within the housing 12 or handle 14. Power would be provided to the motor 40 through the same trigger assembly 44 adapted to receive power from the battery.

The variable speed gear motor 40 may include a shaft 46 mounted with a support bearing 48. The lower end of the shaft 46 may be attached to a horizontally disposed drive pulley 50 described in greater detail below. Actuation of the motor 40 could produce either a selectable clockwise or counterclockwise rotation of the pulley 50. The front portion 24 of the housing 12 may include a spindle 60 having a longitudinal axis aligned along a longitudinal mid-line (ML) defining a first plane of symmetry bisecting the coping saw housing 12 lengthwise. The upper end of spindle 60 may be securely fastened to a carriage 62 configured to translate horizontally and be locked in position by support handle 16. Received along spindle 60 may be a bearing assembly 64 which may be press fit in horizontally disposed pulley 66. Pulley 66 could be retained on spindle 60 by a suitable nut or other fastener 68 attached to spindle 60.

Each of the drive and driven pulleys generally includes a circular disc 80 made either from metal or a polymeric material, and includes a concentric axial passage 82 extending transversely therethrough. The pulleys may be retained on the ends of the shaft and/or spindle by a keyed axial bore configured to mate with a correspondingly shaped key end of the spindle/axle. Alternatively, the axial passages may be splined and configured to mate with a matching set of splines defined on the end of the motor shaft and/or spindle. A set screw or other attachment mechanism may be used to secure attachment. The splines aid in retention of the pulleys and in the case of the motor shaft, ensure the transfer of the rotational force from the motor's axle to the pulley. A nut may also be received along the end of the axle/spindle to retain the pulleys thereon.

Each pulley 50 and 66 includes a circumscribing channel 84 located between upper and lower flanges 86 and 88. In one embodiment, flange 86 may be of a lesser radius or diameter than flange 88 to provide more room to remove or install blades about the pulleys. Disposed in and to one side of each channel 84 is a polymeric ring or O-ring 90 configured to frictionally engage blade 32 and drive it around the pulleys 50 and 66. In a preferred embodiment, the O-ring 90 is disposed in a second channel 85 nested in the bottom of channel 84. With respect to the O-ring 90 on the drive pulley, it provides traction and tracking for the continuous loop blade at least partially circumscribing the pulley. The O-ring 90 in the driven pulley is provided to maintain the blade within the channel 84.

Mounted at four locations within the housing and opposing each other across the gaps 28 and 32, respectively, are pinch and guide roller sets 70A, 70B, and 72A, 72B, respectively. Each roller set may include a pair of rollers, each disposed on opposite sides of the path to be taken by blade 32 and configured to constrain blade 32 along a predefined path across gaps 28 and 30. Disposed outboard of each pinch roller set 70A, 70B, 72A, 72B may be antibackup bearings 74A, 74B and 76A, 76B.

In operation, the operator removes the pulley covers 34 and 36 from the housing by loosening fasteners 38 extending into the housing 12. The covers expose the pulleys 50 and 66 to the operator. The operator then loosens carriage 62 by rotating handle 16 and moving the carriage 62, spindle 60 and pulley 66 toward the work area. The operator may then insert the blade in the channels 94 of the pulleys as desired. With the blade 32 in place the operator simply moves the carriage 62 in the opposite direction to tighten it and locking the carriage in position by re-tightening knob 16. It should be noted at this point that blade 32 may be oriented such that the teeth cut in a clockwise or counterclockwise direction, depending upon the desires of the operator. To change cutting direction, the operator selects the correct switch position for the motor. Additionally, the operator may invert the blade by twisting it inside-out such that the teeth are oriented in a direction opposite that originally set.

Once the blade 32 is in place and tightened, the operator then re-installs the pulley covers 34 and 36 using the fasteners 38. Holding the saw in two hands, the operator may then address the work piece and commence use of the saw by engaging blade 32 in space 28 or space 30 to achieve the desired cut. The speed of the blade can be controlled by changing the position of the trigger assembly 20. The pinch rollers 70A, 70B, 72A, 72B assist in providing a taught blade 32 across the gaps 28 and 30, respectively, to ensure a straight and efficient cut of the work piece.

Referring to FIGS. 3–14, an alternate form of the coping saw 110 embodying the invention is shown. As best shown in FIGS. 3–7, the exterior housing 112 is generally elongate, having a first generally cylindrical end 114 configured to retain a motor described below, and to provide a first hand grip for the operator. The upper end 116 includes a generally centrally disposed power switch 118 which may be a variable position switch or a multi-position switch for controlling the speed of the motor. The opposite end of the cylindrical portion 114 of the housing 112 tapers outwardly into an enlarged detachable housing cover 120 concealing one of the two pulleys described below. Cover 120 as well as a portion of the cylindrical portion 114 of the housing 112 may contain vent holes 122 and 124 to expel debris cut from the workpiece and to cool the enclosed motor. Also contained and extending through the cylindrical portion 114 of the housing 112 may be a directional switch 126 to control the operational direction of the motor.

Figure 10:
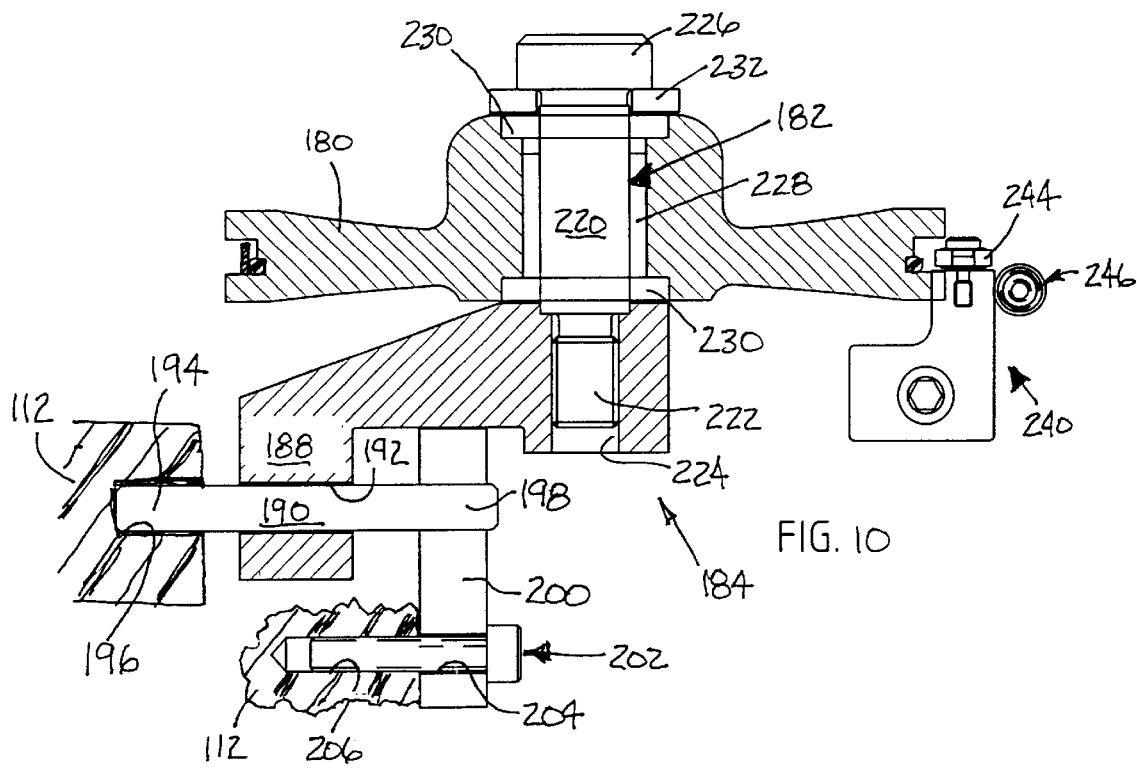
FIGS. 10 and 11 are fragmentary section views illustrating details of a carriage.

Extending radially from end 114, and extending along the length of the housing 112, is a generally tubular or elongate portion 130. The elongate portion 130 is located toward the top 116 of the saw where it forms a bridge 132 over a work space 134. The lower edge 136 of the bridge is defined by two sloping or gently curved surfaces 138 and 140 extending down from the elongate portion 130 (FIG. 10). In a preferred embodiment, the elongate portion 130 is configured to internally receive and retain a rechargeable battery pack described below for providing power to the saw motor. It should be noted that the elongate portion 130 may be aligned along a longitudinal axis of the saw to provide two generally equi-area work spaces, or it may be laterally offset to increase the size of the work space. The latter embodiment will be described in greater detail below.

Spaced from cylindrical portion 114 across the bridge 132, and depending from the elongate portion 130, is a second enlarged end portion of the housing 142 configured to house the second of the two pulleys for the saw. A second pulley cover 144 is attached to portion 142 to conceal the second pulley. Vent holes 146 are also provided to help expel debris cut from the workpiece.

Figure 4:
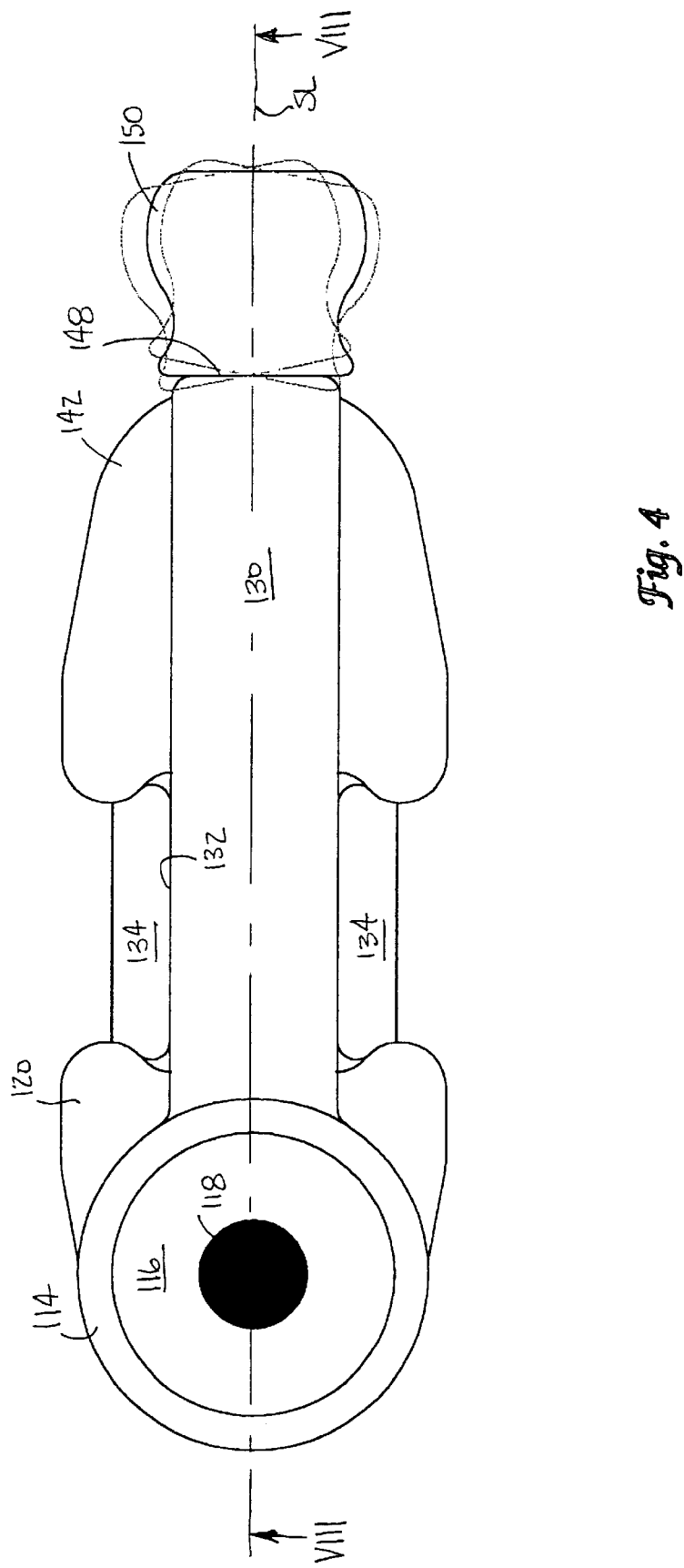
FIG. 4 is a plan view of the invention shown in FIG. 3.
Figure 5:
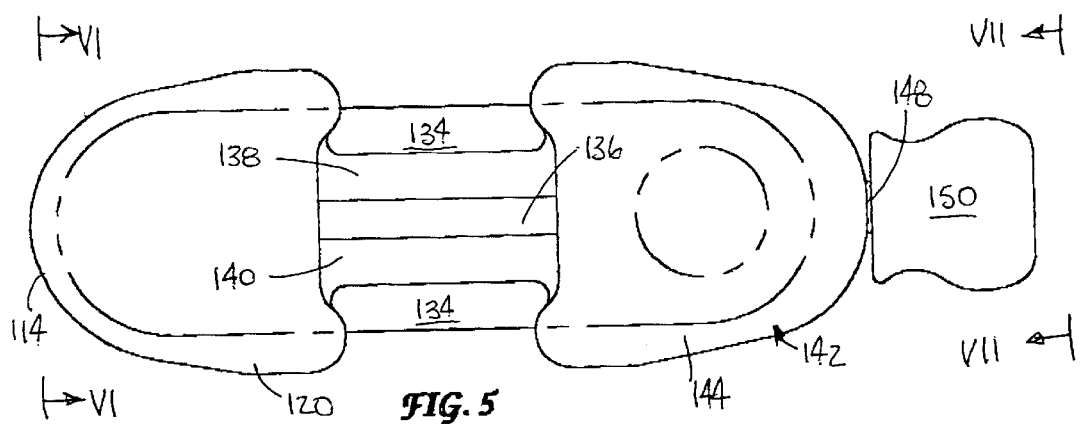
FIG. 5 is a bottom plan view of the invention shown in FIG. 3.
Figure 6:
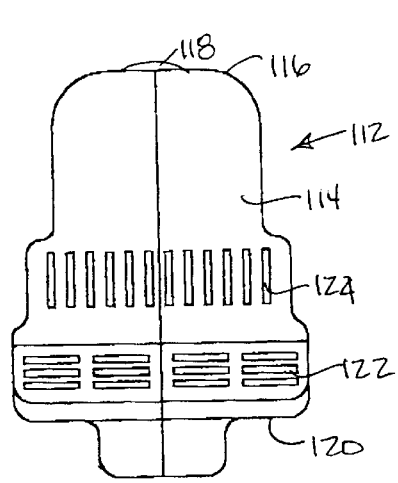
FIG. 6 is an end elevation view of the invention shown in FIG. 3.
Figure 7:
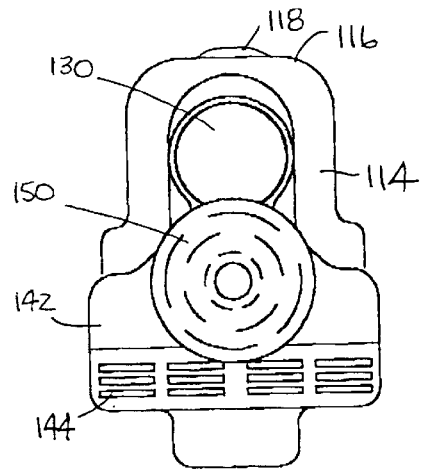
FIG. 7 is an opposite end view of the invention shown in FIG. 3.

It is contemplated that housing 112 and pulley covers 120 and 144 may be made from a polymeric material, preferably a high strength impact plastic, using well known injection molding techniques. In the case of housing 112, it is contemplated that it may be made in two pieces, divided by a line of symmetry extending longitudinally along the housing and passing from the top to the bottom as best shown in FIG. 4 by the symmetry line SL. The bi-symmetrical housing 112 can be designed to provide mounting points for the internal components while at the same time provide areas of increased strength where needed to accommodate bending moments and internal stresses.

With respect to the pulley covers 120 and 144, each may also be made from a high impact polymeric material using the same injection molding techniques, but molded in single pieces configured to mate with housing 112. Small openings are provided to permit ingress and egress for the continuous loop blade. It is contemplated that the pulley covers are retained on the housing by mechanical fasteners such as screws. However, it is further contemplated that the pulley covers may be retained using a pressure fit connection and snapped in place over the portions of the housing.

Pivotally attached to the opposite end 148 of housing 112, below the terminus of the elongate portion 130 above end portion 142, is a handle 150. Handle 150 may be mounted to a ball-like structure 152 (FIG. 6) integral with and extending from the end 148 of the housing 112 to permit the handle to swivel and move slightly about a conical arc. The coupling is such that handle 150 is free to rotate as well as partially swing about an axis parallel to the symmetry line SL and forming the axis for the ball-like protrusion 152.

Referring to FIGS. 6 through 9, the general components of the coping saw 110 are shown in the interior of the housing 112. As briefly mentioned above, housing 112 is preferably a molded two piece housing. The interior of the housing halves are preferably formed by injection molding to include trusses, bosses, bulkheads and other structurally features to provide mounting points for each of the component, where necessary, and to provide structural support for the housing.

Figure 8:
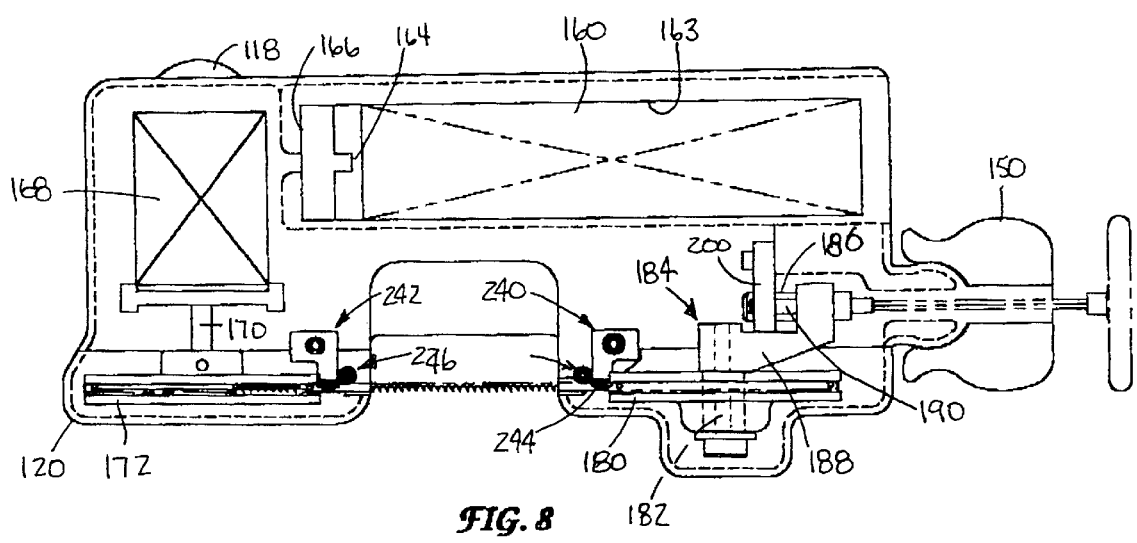
FIG. 8 is a section view taken along line VIII—VIII shown in FIG. 4.

Referring to the bottom left hand portion of FIG. 8, a battery pack 160 may be received within a battery housing 162 formed in the interior 163 of the elongate portion 130. The battery pack 160 may be inserted and removed through an opening formed in the end 148 of housing. The battery housing 162 includes battery contacts 164 at one end 166 of the cavity 162 to provide electrical continuity with the circuits within the housing. Alternatively, an AC adaptor may be received within the battery housing 162 to permit operation using conventional electrical current. It is contemplated that the battery contacts or AC adaptor may be polarized, providing a male and a female contact member. Alternatively, the battery pack or adaptor 160 may have a particular shape configured to be received in housing 162 in a single way such that the approximate electrical contact is arranged.

The contacts 164 of the battery or AC adaptor are in turn operably coupled to switch 118 located in the top of the saw. The switch 118 is also operably coupled to a directional switch 126 to control the direction of rotation of the motor. Located within the housing 112 and below switch 118 is motor 168 which is operably connected to the battery/adaptor contacts 164. It is contemplated that motor 168 may be a bidirectional electric motor and capable of being powered for a substantial amount of time by a single change of the battery pack 160.

Extending from at least one end of the motor 168 is a drive shaft 170. The free end of the drive shaft 170 is mounted with the drive pulley 172. In a preferred embodiment, drive shaft 170 includes a keyed portion which is received in a similarly shaped hole (not shown) in the drive pulley, and coupled together by a set screw 174 extending into a hole (not shown) to the shaft to keep the pulley on the shaft.

Figure 11:
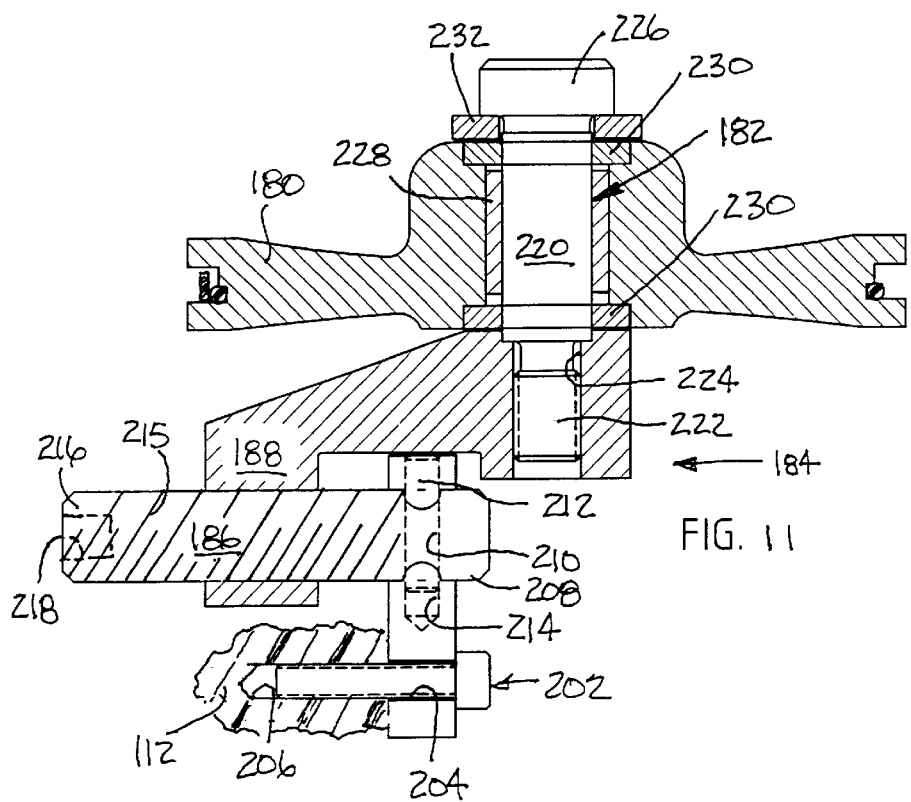

Disposed in sliding engagement in the opposite end 142 of the housing 112 is a second or driven pulley 180. FIGS. 10 and 11. Driven pulley 180 is mounted on a spindle 182 extending from a carriage 184. Carriage 184 is in turn mounted on an adjustable screw 186 extending through a flange 188 depending from the carriage 184. Adjacent and on opposite sides of the screw 186 are guide pins 190 which extend through corresponding holes 192 in the flange 188. Both of the guide pins 190 are fixed with respect to the carriage to the interior of the housing 112. As best shown in FIG. 10, one end 194 of each guide pin is fixed in a recess 196 formed in the housing 112. The opposite end 198 of each guide pin is fixed to a plate 200. The plate 200 is, in turn, fixed in place by threaded fasteners 202 extending through holes 204 in the plate 200 and anchored in recesses 206 formed in the housing interior. With respect to the screw 186, (FIG. 11) proximate one end 208 is a annulus 210 which is partially staked by a pin 212 extending downwardly adjacent screw 188 into a bored hole 214. Thus, screw 186 is free to rotate about its axis and cause the movement of threads 215 which engage compatible threads in the interior of the hole passing through flange 188. The opposite end 216 is likewise captured loosely within a bore (not shown) in the housing interior 112 for reasons which will become apparent below. The end 216 also contains a recessed polygon or shaped recess 218 adapted to receive the end of a polygon shaped wrench. To adjust the carriage, the polygon shaped wrench such as a hex wrench, is passed down through the axis of the handle 150, ball-shaped protrusion 152, and into housing 112 to engage the end of the screw. By rotating the wrench, the carriage moves toward or away from the drive pulley to permit the change of blade.

Referring again to FIGS. 10 and 11, the spindle 182 may be formed from a shaft 220 having a threaded end 222 at one end and received in a bore 224 formed vertically in the carriage 184. The other end of the shaft 220 may terminate in a head 226, having shaped exterior for a wrench, or having a countersunk bore to receive the end of a Allen wrench or similar tool. The pulley 180 may also be mounted with bearings such as roller bearings, needle bearings, and thrust bearings, referenced generally by numerals 228 and 230. A washer may also be provided between the head 226 and the upper bearing 230 to provide best possible rotation of the pulley 180.

Figure 9:
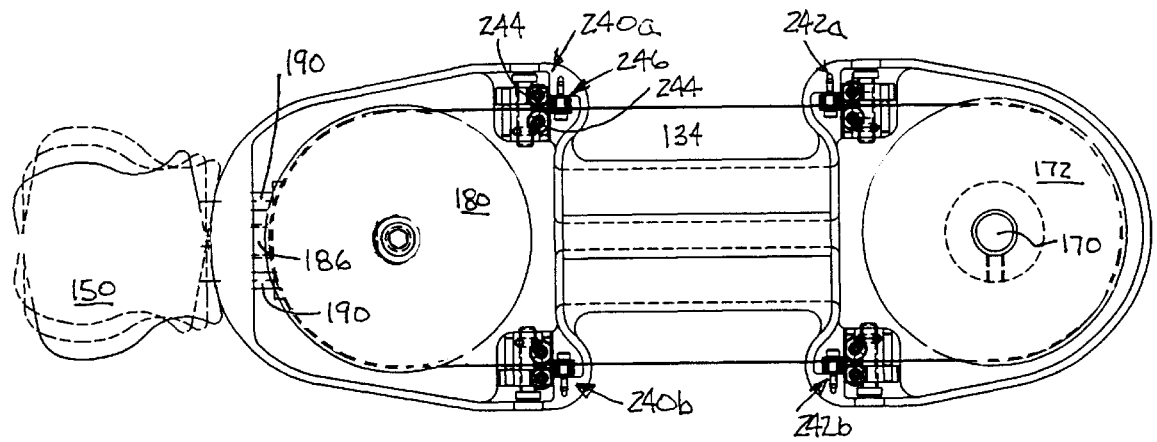
FIG. 9 is a bottom view of the invention with the protective covers removed.
Figure 20:
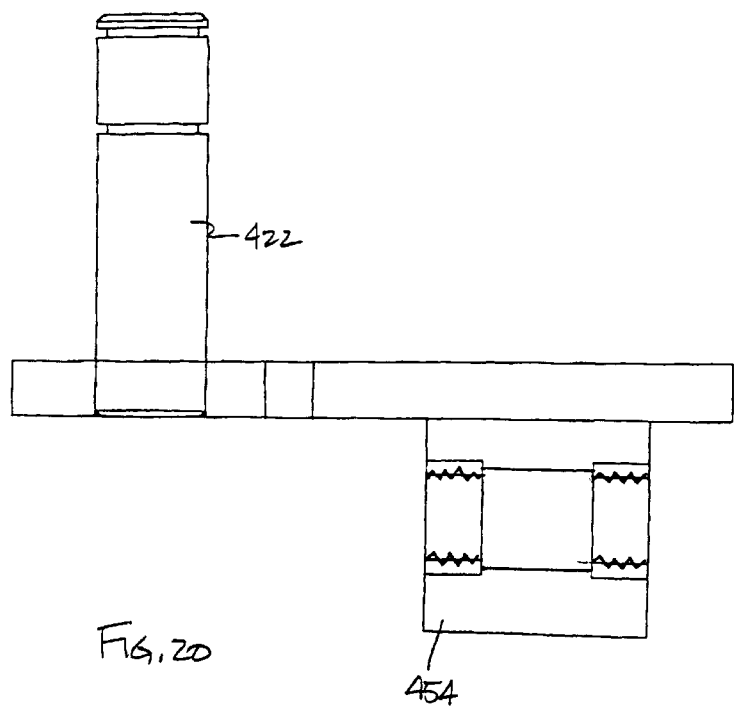
FIG. 20 is a elevation view of an adjustable mounting plate for the driven pulley.

Referring to FIGS. 9 and 10, located generally between drive pulley 172 and driven pulley 180, and mounted to the interior of the housing 112 opposite each other across the work space 134 are blade roller sets 240a, 240b and 242a, and 242b. Each set such as 240a includes two pinch rollers 244 mounted opposite each other perpendicular to the path followed by the continuous loop blade. The pinch rollers 244 are adjustable so the distance between the two rollers can be adjusted to limit the lateral movement of the continuous loop blade there between. Each set also includes at least one anti-backup bearing 246 positioned adjacent the band side of the blade. The anti-backup bearing helps to stiffen the blade when pressure is applied by the operator during the cutting process. The bearing also helps to keep the blade in the circumscribed channel in the respective pulleys. The height of the anti-backup bearings is also preferably adjustable to accommodate blades of different depths and widths. The adjustment point for the respective roller sets is preferably accessible through the exterior of the housing 112 using a conventional screw driver, Allen wrench, or related tool.

Figure 12B:
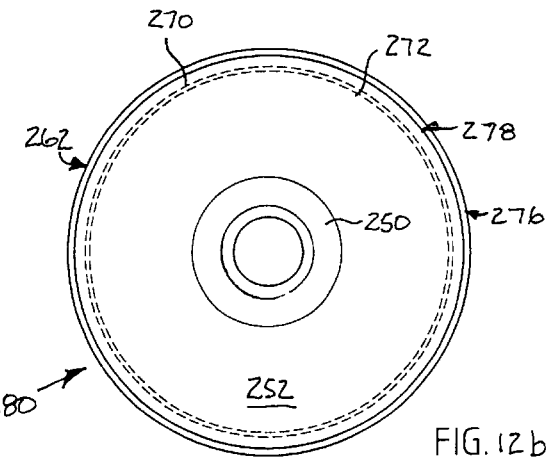
FIGS. 12A and 12B are an elevation view and plan view, respectively, of the drive wheel.
Figure 12A:
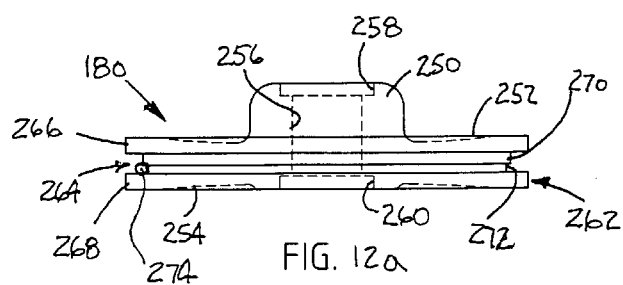

Drawing FIGS. 12A and 12B generally illustrate the driven pulley 180. FIG. 12A illustrates an elevation view and FIG. 12B represents a plan view. As seen in the two figures, the pulley includes a raised central portion or hub to 50 which extends from an upper surface 252. Concentric with hub 250, and extending entirely transversely through the pulley 180 is an axial passage 256, the upper end of which terminates in a substantially greater diameter recessed 258 while a similar recess 260 exists in the lower end of the passage. The dimensions of the respective passages 256, 258, and 260 are such to receive conventional needle bearings and thrust bearings such as 228 and 230 as shown in FIGS. 10 and 11. The perimeter 262, which is generally circular in plan form as shown in FIG. 12B, includes a circumscribing channel 264 defined by upper and lower flanges 266 and 268. A second channel 272 is nested in the bottom wall 270 with a channel 264. It is noted that the nested channel 272 is off set with respect to a center line between flanges 266 and 268, and is preferably oriented toward the lower flange 268. The nested channel 272 is adapted to receive an O-ring 274 which extends around the entire circumference of the channel 272.

Referring to FIG. 12B, in a preferred embodiment, the perimeters 262 of the flanges 266 and 268 have differing diameters. In the preferred embodiment, the diameter of the perimeter to flange 268 is slightly larger than that of the flange 266 as represented by reference numerals 276 and 278 respectively as it is believed that the reduced diameter of the upper flange 266 will aid the operator in installing and replacing the continuous loop blades.

Figure 13B:
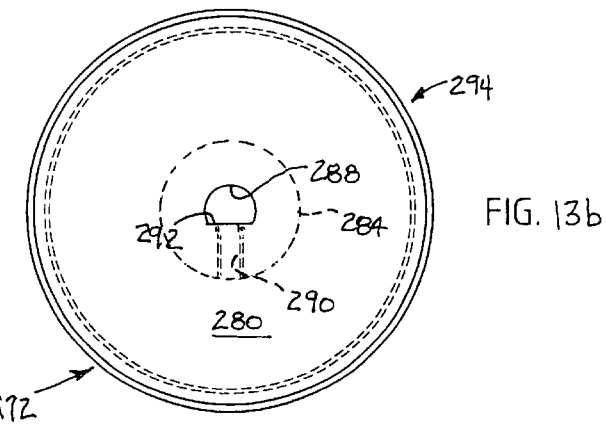
FIGS. 13A and 13B are an elevation and plan view, respectively, of the driven wheel.
Figure 13A:
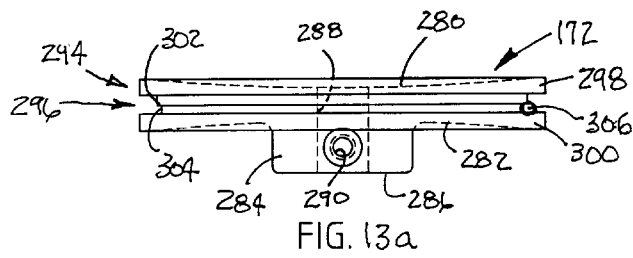

FIGS. 13A and 13B generally provide an elevation view and plan view of the drive pulley 172 and briefly described above. The drive pulley generally includes a slightly concave upper surface and a lower surface 282 which is also slightly concave, but includes a central coaxially extending hub 284. Concentric with hub 284, and extending entirely through the pulley 172 from side 282 through the end 286 of the hub is an axial passage 288. Intersecting passage 288 at a generally right angle, and extending through the hub 284 is a transverse passage 290 which has a threaded interior wall. In a preferred environment, axial passage 288 may have a flat or keyed surface 292 which provides the intersecting surface for the transverse axial passage 290. The key 292 is intended to align with and receive a similar shaped portion of the shaft mentioned above which extends from the motor within the housing. The transverse passage 290 is intended to receive a set screw or other fastener threaded therein which is then urged against the keyed portion of the shaft to retain the pulley 172 on the end of the shaft.

As better illustrated in FIG. 13B, the pulley 172 includes a perimeter 294 which contains a circumscribing channel 296 defined between upper and lower flanges 298 and 300. Contained within channel 296 and formed in the bottom wall 302 is a second channel 304 which is similar to channel 272 described above. In the embodiment of the drive pulley described herein, it is also preferred that the nested channel 304 be laterally offset towards the lower flange 300. The nested channel 304 is similarly configured to receive a O-ring 306 to provide traction to the continuous blade, and to similarly provide a tracking to the blade as it rotates between or around the drive and driven pulleys.

Figure 14:
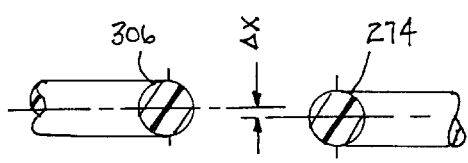
FIG. 14 is a diagram generally illustrating the vertical offset between the drive pulley and the driven pulley to track the blade on the two pulleys.

Referring to FIG. 14 this illustration shows a preferred vertical offset between the height of the drive pulley 172 and the driven pulley 180. To simplify matters, the height difference is shown as a Delta X between the O-rings 274 and 306 and their respective pulleys. In a preferred embodiment, the vertical offset between the respective pulleys is approximately 0.007 and 0.030 inch; and most preferably about 0.015 inch. It is believed that the combination of the O-ring offset in the nested channel 272 and 304 of their respective pulleys 172 and 180, coupled with the offset in the vertical access between the two components, the continuous loop blade is automatically centered or tracked properly within the channels 264 and 296 and retained on the pulleys. For the purposes of this application, the vertical offset between the drive and driven pulley, coupled with the location of the O-rings in the nested channels 272 and 304, will be referred to as the bisected hyperbola technique or structure.

In operation, the operator inserts the adjustment wrench to the central portion of the handle 150 and the ball-like protrusion 152 such that the end of the wrench is received in the recessed 218 formed in the end 216 of the threaded screw 186. Rotation of the wrench causes the carriage 184 to move along the screw 182 and the guide pins 190 in a direction generally parallel to the longitude axis to the saw 110. By removing the caps or covers 120 and 144, the operator can then access the continuous loop saw blade around the pulleys 172 and 180. By rotating the wrench in a first direction, the carriage 1 84 will move toward the pulley 172 to provide sufficient room to either remove or install a new continuous loop blade into the channels 264 and 296 of the pulleys. By rotating the wrench in the opposite direction, the carriage 184 will move away from the pulley 172 to tighten the continuous loop blade. It is contemplated that there should be sufficient tension or resistance in the threaded screw 186 to prevent inadvertent loosening or movement of the carriage 184 along the screws 186 and/or guide pins 190.

Once the continuous loop blade is in place and tightened, the operator then reinstalls the pulley covers to protect the pulleys and the guide bearings from a direct impact. The operator then inverts the saw by grasping the cylindrical end portion 114 in one hand, and the handled portion 150 in the opposite hand. The pivoting aspect of the handle 150 permits the operator to rotate the saw about the longitudinal axis of the saw to permit easy use. To actuate the saw, the operator simply depresses the switch 118 with his thumb to cause the blade to rotate about the pulleys. The direction of the blade rotation may be changed by the operator changing the switch 126.

As the blade rotates, the guide bearings or roller sets 240 and 242 provide lateral stiffness to the blade, while the backup roller 246 provides a vertical stiffness across the work space 134. The combined tension on the blade provided by the translatable carriage 184, the pinch roller sets 244 and the back up bearings 246, the two sections of the saw blade traversing the work space 134 are quite robust and access the work space quite easily.

As briefly mentioned above, it is contemplated that the instant invention may be configured as an attachment or accessory to a conventional power tool such as a rotary drill. One such embodiment is shown in FIGS. 15 through stet. As shown in the drawing figures, a frame 410 is provided, formed from an elongate metallic plate such as one-quarter inch thick aluminum stock. An intermediate section of the frame 410 would have a first upright member 412 extending substantially perpendicular thereto and spaced from a second upright member 414 of significant lesser height. Interconnecting the first and second upright members, and providing flexural stiffness to the frame 410 is a T-shaped flange 416. Also mated to the frame 410 and extending from opposite sides thereof are a first and second guide roller mount block plate 418 and 420, respectively-the first guide roller mounting plate 418 preferably terminating proximate the first upright member 412 and the second guide roller mounting plate 420 extending slightly past the second upright member 414. A gusset or brace 422 may interconnect the first guide roller mounting plate 418 to the first upright member 412.

Referring to FIGS. 15 and 16, a drive shaft 424 is mounted to frame 410 in perpendicular relation thereto by a bearing 426 mounted in a hole 428 formed in the frame 410. Bearing 426 may be a conventional roller bearing and the drive shaft 424 maybe retained within bearing by split rings 430 received in grooves on opposite sides of the bearing. One end of the shaft 432 is adapted to be received in a collet of rotary drill while the opposite end 434 is press fit to a pulley 436.

At the opposite end of the frame 410, a driven pulley mounting plate 438 is attached in sliding relationship to frame 410. Mounted to plate 438, and extending substantially perpendicularly therefrom, and up through slot 440 in frame 410, is the driven pulley shaft 442. The upper end of shaft 442 is configured to receive a bearing 444 mounted in driven pulley 446. Split rings 448 are received on the shaft 442 on opposite sides of the bearing 442 to retain the driven pulley in place. Fasteners 450, extending through long slots 452 on opposite sides of the oval slot 440, are received by the mounting plate 438 and are used to fix the mounting plate in position with respect to the frame 410. A threaded rod 453 extending through block 454 is provided for placing tension on the continuous blade extending around pulleys 436 and 446. The handle 456 at the end of the rod 452 permits the user to obtain a good grip in rotating the threaded rod 452. The opposite end of the threaded rod 452 engages the section member 414 to urge the mounting plate 438 to the right as shown in FIG. 16.

Disposed between pulleys 436 and 446, and located at each end of the guide roller mounting plates 418 and 420 may be guide roller assemblies 460. Each guide roller stet bracket 462 (see FIG. 21). A bolt or other fastener extending through the mounting plate 418, 420 is received in the bottom of the bracket 462. The opposite end of the bracket includes a yoke 464 for retaining the guide roller 468 with a transverse pin 470. Shown in FIG. 21, each guide roller 468 has an annular grove or channel 472. The channel includes an upper tapered wall portion 474 wherein the angle between the tapers may be on the order of 20 to 40 degrees. Nested in the bottom of the tapered wall portion is a more rectangular channel portion 476, the dimensions of which are just slightly larger than the thickness of the continuous loop blade used in the power coping saw. The depth of the rectangular channel portion is also slightly less than the overall thickness of the blade such that when the continuous loop blade is in the channel, the tooth section of the blade is within the tapered wall portion while the opposite edge of the blade resides or rests in the bottom of the rectangular channel portion. The conventional needle-bearing or similar type of bearing structure is fitted concentrically within the roller axis of the bearing and mounted on the bracket 462. It should be noted that the guide roller assembly 460 described herein may be used on any one of the prior embodiments of the powered coping saw described above as the roller bearing permits the partial withdrawal of the continuous loop saw blade vertically and automatically re-centers the saw blade when the blade again rests within the bearing. This could be particularly advantageous when withdrawing this saw blade from a kerf of a cut made by the saw.

Referring again to FIGS. 15 and 16, the drive pulley 436 and the driven pulley 446 may be at least partially enclosed by covers 478 and 480. Each cover may include a generally U-shaped vertical wall 482 having an upper edge mounted to a plate 484. One or more fasteners 486 are intended to extend through the vertical wall 482 into threaded blocks attached to the frame 410.

As briefly mentioned above, the power source for the powered coping saw shown in FIGS. 15 through 21 is contemplated to be a conventional rotary tool such as a rotary drill. Given the substantial number of different rotary drill designs on the market, a variety of attachment members are anticipated to be necessary to attach a rotary drill to the frame 410. In general, a cradle 490 (FIG. 15) may be designed for a variety of different rotary tool designs and configured to be attached to side 492 of the first upright member 412. U-shaped bolts having appropriate dimensions may be provided and adapted to be received over a portion of the rotary drill housing wherein the ends of the bolts could be received in the first upright member 412. Wing nuts or conventional nuts could be received over the ends of the U-shaped bolts and tightened to fix the rotary drill in position such that the chuck of the drill is aligned with and receives the one end of the drive shaft 424. Alternatively, an adjustable clamp 494, such as a modification of a hose clamp, may be used to hold the power source against the attachment.

In operation, the operator mounts the rotary drill to the frame 410 using the specially configured cradle and fasteners/clamps. The operator then tightens the chuck of the drill on the end of the drive shaft 424. If the operator desires to increase the tension on the continuous loop blade extending around the pulleys 436 and 446, the operator loosens the fasteners 450 extending through the frame 410 and into the driven pulley mounting plate 438 and simply rotates the threaded rod 452 such that one end is urged against the second upright member 414. Such an action causes the mounting plate 438 and driven pulley 446 in a direction away from the drive pulley 436. When the desired tension is reached, the operator simply tightens the fasteners 450 sufficiently to hold the mounting plate 438 in place. At that point, the operator is then free to loosen the rod 452 such that the handle 456 freely pivots to enable the user to move the device more freely and nimbly. The user's other hand is in the trigger of the rotary drill to control the speed of the saw blade. With two portions of the continuous loop saw blade exposed between the covers 478 and 480, the user selects which blade section to utilize in performing the cut on the work piece.

In each of the embodiments described above, the stress on the continuous loop blade around the drive and driven pulleys may be reduced significantly with the aid of additional rollers located between the guide rollers and the pulleys. FIG. 22 is a schematic diagram illustrating the placement of at least one idler roller adjacent each pulley on the saw. The instant figure illustrates two idler rollers proximate one pulley. It is contemplated that a similar arrangement may be implemented at the opposite end of the saw. Accordingly, this description will be limited just to one end. The drawing illustrates the two pulleys 436, 446 similar to those described above. Located radially from the axis of rotation of each pulley 436, 446 at two equal distances therefrom, yet on opposite sides of the lateral midline of the saw, are idler rollers 502 and 504. Each roller 502 and 504 preferably includes a rubber wheel or outer perimeter. The outer perimeter of the wheel may also be tangential to a line parallel to the rectangular channel portion 476 of the guide roller 468 as illustrated by the line 508. The height of the roller is approximately equal to that of the pulley 436, 446 and guide rollers 468. The purpose of the roller 502, 504 is to 1) increase the distance between the parallel blade segments or portions of the continuous loop blade, as well as 2) increase the angle at which the continuous loop blade spools on and off of the drive and driven pulley 436, 446. Each roller 502, 504 not only assists in reducing the angle of the continuous loop blade to and from the guide rollers, but it also assists in aligning the continuous loop blade with the channel in each drive and driven pulley. The rubber exterior to each roller 502, 504 also acts as a cushion, absorbing some of the stress and tension on the continuous blade during the cutting process, and thus increases the overall life of the continuous blade. In a preferred embodiment, each roller 502, 504 is to remain in fixed relationship with the adjacent drive or driven pulley 436,446 such that the distance between the drive or driven pulley 436, 446 and each roller, as well as the radial angle, remains constant. For example, in the embodiment of the invention shown in FIG. 21, rollers 502, 504 are mounted to the mounting plate 420 such that upon adjustment of the plate, the rollers 502, 504 would move with the driven pulley 446. Similarly, at the drive pulley end of the saw, the rollers 502, 504 would be fixed on the plate 418 with respect to the pulley 436.

In still another embodiment of the invention, it is contemplated that it may be desirable to expose only a single section of the continuous loop blade, and increase the throat or work space. FIGS. 23 through 26 illustrate one embodiment 610 wherein the exterior housing 612 is generally elongate, having a first generally cylindrical end 614 configured to retain a motor as described in greater detail below, and provide a first grip for the operator. The upper end 616 includes a generally centrally disposed power switch 618 which may be a variable speed switch or a mutli-position switch for controlling the speed of the motor. The opposite end of the cylindrical portion 614 of the housing 612 tapers outwardly into an enlarged detachable housing cover 620 concealing the two pulleys described above. Cover 620 as well as a portion of the cylindrical portion 614 of the housing 112 may contain vent holes 622 to expel debris produced by the cutting of the work piece. The vent holes may also provide discharge ports for heated air used in the cooling of the motor.

Extending generally tangentially from the cylindrical end 614, and extending along length of the housing 112, is a generally tubular or elongate portion 624. The elongate portion 624 is laterally offset to one side of the saw from the mid line interconnecting the two pulleys, where it joins with an opposite end of the housing 626 generally enclosing the opposing pulley (driven pulley) at the opposite end 626 of the housing. Defined on the side of the housing opposite that of the elongate portion 624 is a gap 628 which expands toward the interior of the work space or arch 630. The elongate portion 624 forming one side of the saw acts as a bridge between the two pulleys. Attached to the end 626 of the housing is a handle 632 mounted on a generally ball shaped member extending from the housing 612. The connection permits the handle to swivel about its longitudinal access as well as to tilt in a wide variety of directions.

Figure 24:
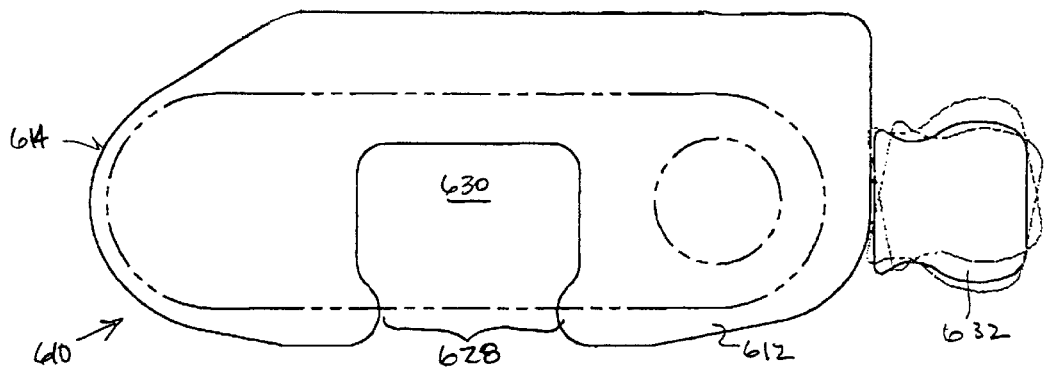
FIG. 24 is a bottom plan view of the invention shown in FIG. 23.
Figure 25:
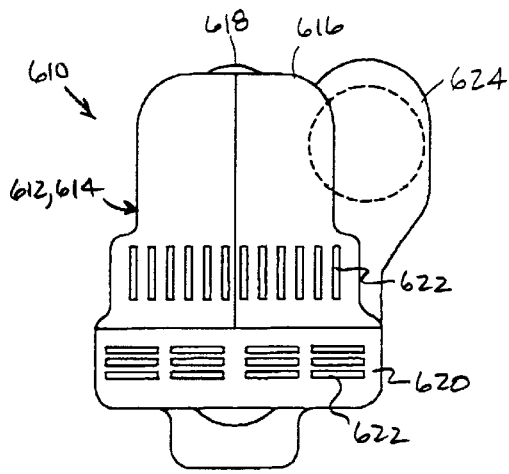
FIG. 25 is an end view of the alternate embodiment.
Figure 26:
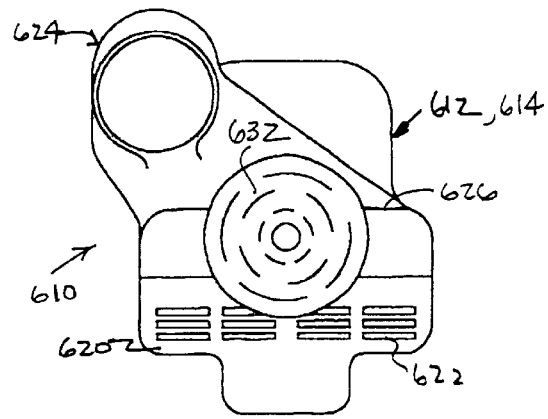
FIG. 26 is a view of the opposite end of the invention shown in FIG. 23.
Figure 23:
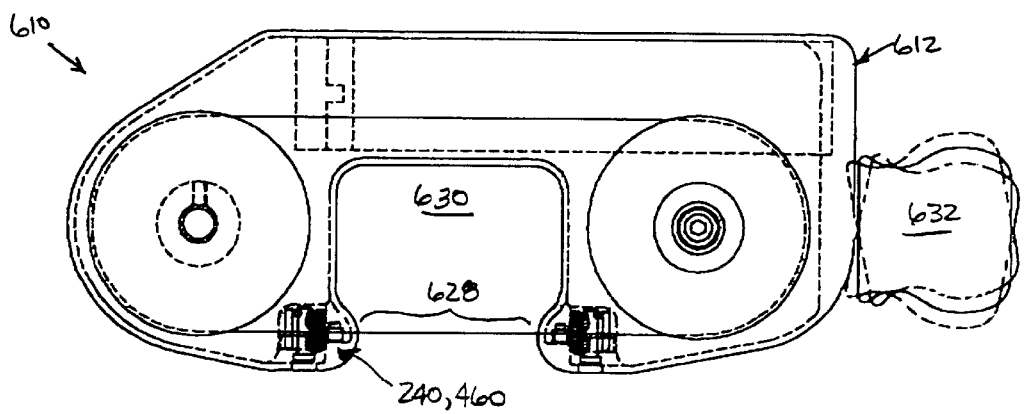
FIG. 23 is a plan view of yet another embodiment of the invention.

Referring to FIGS. 24–26, the lower portion of housing includes a single piece housing cover which encloses the pulley at end 626, extends along the bottom of the elongate portion 624 and covers a pulley at the cylindrical end 614, thus serving to enclose approximately three-fourths of the continuous loop blade, including the portion of the blade segment parallel to that extending across the gap 628. Pinch rollers similar to those described above, including guide roller assemblies 460 and pinch roller sets 240, 242 may be disposed within the housing, on opposite sides of the gap to provide lateral and vertical strength to the continuous loop blade. Likewise, idler rollers such as 502, 504 may be positioned adjacent each drive pulley and driven pulley to assist in guiding the continuous loop blade about the circuit and absorb any tensional variations produced as a result of the saw's use. Other than the lateral offset of the elongate portion, the components of the saw and its operation work generally in accordance with the embodiments described above.

Just as with conventional saws, including circular saws, the dimensions of the instant invention may vary depending upon the particular application needed. For example, it is contemplated that a smaller version of the invention, having a gap on the order of several inches wide, it may be used for small projects. On the other hand, a larger embodiment, wherein the gap may be on the order of 12 inches may be designed for substantially larger projects. The particular application of the saw depends in substantial part upon the depth and height of the work space traversed by the continuous loop blade. Furthermore, although a continuous loop saw blade is described, it is understood and anticipated that two independent saw blade segments may be spaced from each other, and connected at opposite ends to reciprocating rotary actuators which produce a back-and-forth action in the saw blades to create the cutting action. In addition, it is further understood that the guide rollers, back-up bearings, and the idler rollers may be incorporated in any one of a number of configurations on different forms of the invention to achieve a desired result. The description with respect to the specific embodiments mentioned above should not be considered limiting as to the combination of components to complete the invention The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The embodiments of the invention in which an exclusive property or privilege is claimed are defined as follows:

I claim:

1. A mechanized hand-held saw having a continuous loop blade, comprising in combination:

a housing having a first and second portions interconnected by a bridge defining at least one arc-shaped opening separating said first and second portions, said first and second portions and said bridge contained in a first plane of symmetry and containing a longitudinal axis for said housing;

a motor disposed in said first portion of said housing, said motor having a shaft extending from at least one end thereof and having an axis contained in said first plane of symmetry;

a drive pulley mounted in said first portion of said housing to said shaft extending from said at least one end of said motor and configured to receive a portion of the continuous loop blade, said drive pulley contained in a second plane of symmetry different from said first plane of symmetry;

a carriage disposed in said second portion of said housing and translatable between a first and second positions along a line approximately parallel to said first plane of symmetry; and a driven pulley mounted on said carriage and generally aligned with said first pulley and configured to receive another portion of the continuous loop blade;

wherein the continuous loop blade on said drive pulley and said driven pulley provides two sections of the blade which span said arc-shaped opening at two spaced-apart locations and move in opposite directions.

2. The mechanized hand-held saw as defined in claim 1, further including a plurality of blade guides mounted in said first and second portions of said housing on opposing sides of said arc-shaped opening for supporting the continuous loop blade at said two spaced-apart locations.

3. The mechanized hand-held saw as defined in claim 1, further including a battery pack detachably mounted to said housing for providing power to said motor.

4. The mechanized hand-held saw as defined in claim 1, wherein said drive pulley and said driven pulley each include an o-ring.

5. The mechanized hand-held saw as defined in claim 1, wherein said carriage includes an adjustment member for translating said carriage between and including said first and second positions.

6. The mechanized hand-held saw as defined in claim 1, further including a handle pivotally attached to said second portion of said housing for manually supporting said second end of the hand-held saw while rotating the hand-held saw about a longitudinal axis.

7. The mechanized hand-held saw as defined in claim 2, wherein each of said plurality of blade guides includes pinch rollers, located on opposite sides of the continuous loop blade.

8. The mechanized hand-held saw as defined in claim 2, wherein each of said plurality of blade guides includes anti-backup bearings engaging the continuous loop blade.

9. The mechanized hand-held saw as defined in claim 3, wherein said battery pack is located within said bridge interconnecting said first and second portions of said housing.

10. The mechanized hand-held saw as defined in claim 4, wherein said o-ring on each of said drive pulley and said driven pulley are disposed in dissimilar planes.

11. The mechanized hand-held saw as defined in claim 5, further including an adjustment tool configured to engage said adjustment member to translate said carriage between said first and second positions.

12. A mechanized hand-held saw, comprising in combination:

a housing having first and second spaced-apart end portions interconnected together by a bridge defining an arc between said first and second end portions, said first and second end portions and said bridge contained in a first plane of symmetry;

a motor in said first end portion of said housing and having a shaft extending from at least one end thereof, an axis of said shaft contained in said first plane of symmetry;

a drive pulley in said first end portion of said housing and mounted to said shaft extending from said at least one end of said motor, said drive pulley contained in a second plane of symmetry different from said first plane of symmetry;

a carriage in said second end portion of said housing and movable between a first and second positions; and a driven pulley mounted to said carriage in said second end portion of said housing;

a continuous loop blade mounted on said drive pulley and said driven pulley providing a first and second sections of blade spanning said arc-shaped opening at spaced-apart locations; wherein said first section of said continuous loop blade moves in a direction opposite to that of said second section of said continuous loop blade to provide two cutting sections of blade.

13. The mechanized hand-held saw as defined in claim 12, further including a power source disposed within said housing and attached to said motor.

14. The mechanized hand-held saw as defined in claim 12, further including an o-ring disposed in offset circumferential relationship around each of said drive and driven pulleys for centering said continuous loop blade on said drive and driven pulleys.

15. The mechanized hand-held saw as defined in claim 12, further including blade guides mounted on opposite sides of, and proximate to, said arc-shaped opening in said first and second end portions, for supporting said continuous loop blade across said arc-shaped opening.

16. The mechanized hand-held saw as defined in claim 12, further including a carriage adjustment attached to said carriage for moving said carriage between said first and second positions.

17. The mechanized hand-held saw as defined in claim 12, further including a handle pivotally coupled to said second spaced-apart end portion for manually supporting the mechanized hand-held saw and swiveling of said handle about an axis which parallels said longitudinal axis of the mechanized hand-held saw.

18. The mechanized hand-held saw as defined in claim 12, wherein said housing includes two halves configured to join together along said first plane of symmetry.

19. The mechanized hand-held saw as defined in claim 12, further including covers attached to said first and second spaced-apart end portions for covering said drive pulley and said driven pulley without interfering with said continuous loop blade.

20. The mechanized hand-held saw as defined in claim 19, wherein each of said covers includes ports for preventing debris build-up and providing ventilation.

21. A mechanized, hand-held saw for cutting a work piece, comprising in combination:

a frame having a first and a second ends;

a handle rotatably coupled to one of said first and second ends of said frame;

a drive pulley mounted on a shaft extending from said first end;

a driven pulley proximate said second end of said frame and translatable between a first and a second position relative to said drive pulley; and a continuous loop blade extending at least partially around said drive pulley and said driven pulley to provide two exposed sections of said continuous loop blade gap between said drive pulley and said driven pulley wherein either blade maybe used to cut the work piece.

22. The mechanized, hand-held saw as defined in claim 21, further including at least one guide roller assembly proximate each of said drive pulley and said driven pulley for providing lateral and vertical stability to each of said two exposed sections of said continuous loop blade between said drive pulley and said driven pulley.

23. The mechanized, hand-held saw as defined in claim 21, further including at least one idler wheel assembly proximate each of said drive pulley and said driven pulley for absorbing tensional variations produced in said continuous loop blade during use, and for guiding said continuous loop blade to or from said drive pulley and said driven pulley.

24. The mechanized, hand-held saw as defined in claim 21, further including:

a mounting plate attached to said second end of said frame and having said driven pulley interconnected thereto by a shaft;

an adjustment mechanism attached to said mounting plate for translating said driven pulley between said first position and said second position relative to said drive pulley.

25. The mechanized, hand-held saw as defined in claim 21, further including a fixture on said frame for detachably mounting a rotary power tool, said rotary power tool attached to a free end of said shaft for said drive pulley.

26. The mechanized, hand-held saw as defined in claim 22, further including:

a mounting plate attached to said second end of said frame and having said driven pulley interconnected thereto by a shaft;

an adjustment mechanism attached to said mounting plate for translating said driven pulley between said first position and said second position relative to said drive pulley.

27. The mechanized, hand-held saw as defined in claim 26, further including a fixture on said frame for detachably mounting a rotary power tool, said rotary power tool attached to a free end of said shaft for said drive pulley.

28. The mechanized, hand-held saw as defined in claim 21, further including at least one idler wheel assembly proximate each of said drive pulley and said driven pulley for absorbing tensional variations produced in said continuous loop blade during use, and for guiding said continuous loop blade to or from said drive pulley and said driven pulley.

29. A coping saw, comprising in combination:

a housing having an intermediate opening separating a first and second end portions;

a handle rotatably coupled to an end of one of said first and second end portions of said housing;

a drive pulley mounted in said first end portion;

a driven pulley mounted in said second end portion; and a continuous loop blade extending at least partially around said drive pulley and said driven pulley and extending across said intermediate opening to provide two exposed sections of said continuous loop blade movable in opposing directions for cutting the work piece.

30. The coping saw as defined in claim 29, further including a guide assembly on opposite sides of said intermediate opening for supporting each of said two exposed sections of said continuous loop blade.

31. The coping saw as defined in claim 29, further including a carriage disposed in sliding relationship within said housing, and interconnected to said driven pulley by a shaft, for moving said driven pulley between a first and a second positions relative to said drive pulley.

32. The coping saw as defined in claim 29, further including at least one idler assembly spaced from each of said drive pulley and said driven pulley and engaging said continuous loop blade for absorbing tensional variations in said continuous loop blade and for directing said continuous loop blade on and off of each of said drive pulley and said driven pulley.

33. The coping saw as defined in claim 29, further including a motor interconnected to said drive pulley by a shaft for providing rotary motion to said drive pulley.

34. The coping saw as defined in claim 29, further including a fixture associated with said housing for detachably mounting a rotary power tool to said housing in a manner for rotating said drive pulley.

35. The coping saw as defined in claim 29, wherein each of said drive pulley and said driven pulley includes:

a circumscribing annular channel defined about a perimeter thereof for receiving a portion of said continuous loop blade therein; and a traction member disposed within, and laterally to one side of, said circumscribing annular channel for centering said continuous loop blade on said driven pulley and said drive pulley.

36. The coping saw as defined in claim 29, wherein said drive pulley and said driven pulley are offset vertically with respect to each other by a predetermined distance such that they are contained in different, yet parallel planes.

37. The coping saw as defined in claim 30, further including a carriage disposed in sliding relationship within said housing, and interconnected to said driven pulley by a shaft, for moving said driven pulley between a first and a second positions relative to said drive pulley.

38. The coping saw as defined in claim 37, further including at least one idler assembly spaced from each of said drive pulley and said driven pulley and engaging said continuous loop blade for absorbing tensional variations in said continuous loop blade and for directing said continuous loop blade on and off of each of said drive pulley and said driven pulley.

39. The coping saw as defined in claim 38, further including a motor interconnected to said drive pulley by a shaft for providing rotary motion to said drive pulley.

40. The coping saw as defined in claim 38, further including a fixture associated with said housing for detachably mounting a rotary power tool to said housing in a manner for rotating said drive pulley.

41. The coping saw as defined in claim 39, further including one of an AC or DC power source connected to said motor for providing power to said motor.

42. A powered saw, comprising:

a frame having a first end and a second end;

a handle rotatably coupled to one of said first and second ends of said frame;

a shaft extending from said first end of said frame and supporting a first of two spaced-apart pulleys;

a carriage mounted in sliding relationship to said second end of said frame, said carriage having a shaft extending therefrom supporting a second of said two spaced-apart pulleys; and a continuous loop blade mounted at least partial around said two spaced-apart pulleys.

43. The powered saw as defined in claim 42, further including at least one guide roller assembly mounted on said first and said second ends of said frame and intermediate said two spaced-apart pulleys for providing dimensional rigidity to a portion of said continuous loop blade extending between said two spaced-apart pulleys.

44. The powered saw as defined in claim 43, further including a motor operably connected to said shaft extending from said first end of said frame for rotating said first of said two spaced-apart pulleys.

45. The powered saw as defined in claim 44, further including an adjusting member mounted on said carriage for tightening and loosening said continuous loop blade.

46. The powered saw as defined in claim 1, further including at least one idler roller disposed intermediate said guide roller and a respective one of said two spaced-apart pulleys for absorbing tensional variations experienced by said continuous loop blade and feeding said continuous loop blade to and from said respective one of said two spaced-apart pulleys.

47. The powered saw as defined in claim 46, further including a housing enclosing said frame, said two spaced-apart pulleys, said at least one guide roller assembly, said adjustment member, and said idler roller, and exposing two sections of said continuous loop blade intermediate said two spaced-apart pulleys.

48. The powered saw as defined in claim 46, wherein said frame and said housing define a work space adjacent each of said two sections of said continuous loop blade to permit access by portions of a workpiece.

49. The powered saw as defined in claim 46, wherein said frame defines a bridge interconnecting said first end of said frame with said second end of said frame.

50. The powered saw as defined in claim 46, wherein said housing defines a bridge extending between said two spaced-apart pulleys.

51. A powered coping saw, comprising in combination:

two spaced-apart rotary actuators supported by a frame;

two saw-blade sections extending between said two spaced-apart rotary actuators;

a drive mechanism coupled to a first of said two spaced-apart rotary actuators for causing said two saw-blade sections to move in at least one direction; and a swiveling and tilting handle attached to one end of said frame to be grasped by an operator to permit the operator to rotate and tilt the powered coping saw relative to said swiveling and tilting handle during operation of the powered coping saw.

52. The powered coping saw defined in claim 51, further including at least one blade guide roller for at least one of said two saw-blade sections and disposed intermediate said two spaced-apart rotary actuators for providing dimensional support to said saw-blade section.

53. The powered coping saw defined in claim 51, further including a blade tensioning assembly interconnected to one of said two spaced-apart rotary actuators for adjusting a tension on said two saw-blade sections.

54. The powered coping saw defined in claim 51, further including an idler assembly in contact with at least one of said two saw-blade sections.

55. The powered coping saw defined in claim 51, further including a swiveling handle disposed at one end of the coping saw for swiveling the coping saw about a hand hold by an operator.

56. The powered coping saw defined in claim 51, further including detachable covers enclosing said two spaced-apart rotary actuators, leaving said two saw-blade sections exposed.

57. The powered coping saw defined in claim 51, wherein each of said two spaced-apart rotary actuators each include a member for centering said two saw-blade sections with respect to said two spaced-apart rotary actuators.

58. The powered coping saw defined in claim 51, wherein said frame forms a bridge between said two spaced-apart rotary actuators.

59. The powered coping saw defined in claim 52, further including a blade tensioning assembly interconnected to one of said two spaced-apart rotary actuators for adjusting a tension on said two saw-blade sections.

60. The powered coping saw defined in claim 59, further including an idler assembly in contact with at least one of said two saw-blade sections.

61. The powered coping saw defined in claim 60, further including a swiveling handle disposed at one end of the coping saw for swiveling the coping saw about a hand hold by an operator.

62. The powered coping saw defined in claim 61, further including detachable covers enclosing said two spaced-apart rotary actuators, leaving said two saw-blade sections exposed.

63. The powered coping saw defined in claim 62, wherein each of said two spaced-apart rotary actuators includes a member for centering said two saw-blade sections with respect to said two spaced-apart rotary actuators.

64. The powered coping saw defined in claim 63, wherein said frame forms a bridge between said two spaced-apart rotary actuators.

* * * * *

UNITED STATES PATENT AND TRADEMARK OFFICE
CERTIFICATE OF CORRECTION

PATENT NO.  : 6,442,848 B1
DATED       : September 3, 2002
INVENTOR(S) : Ethan Dean It is certified that error appears in the above-identified patent and that said Letters Patent is hereby corrected as shown below:

Column 1,
Line 45, "operators" should read -- operator's --

Column 2,
Line 14, "having" should read -- has --
Line 29, "portions" should read -- portion --

Column 4,
Line 9, "a" should read -- an --
Line 48, "portions" should read -- portion --
Line 55, "other" should read -- another --

Column 5,
Line 18, "forthe" should read -- for the --
Line 18, "particular" should read -- particularly --
Line 23, "anyone" should read -- any one --
Line 24, "manufactures" should read -- manufacturers --

Column 6,
Line 29, "locking" should read -- locks --
Line 45, "taught" should read -- taut --

Column 7,
Line 57, "structurally" should read -- structural --
Line 59, "component" should read -- components --
Line 65, "of housing" should read -- of the housing --

Column 8,
Line 44, "a annulus" should read -- an annulus --
Line 65, "a Allen" should read -- an Allen --

Column 9,
Lines 28 and 29, "to50" should read -- 250 --
Line 32, "recessed" should read -- recess --
Line 56, "172 and" should read -- 172 as --

Column 10,
Lines 15 and 16, "a O-ring" should read -- an O-ring --
Line 40, "recessed" should read -- recess --

UNITED STATES PATENT AND TRADEMARK OFFICE
CERTIFICATE OF CORRECTION

PATENT NO. : 6,442,848 B1
DATED : September 3, 2002
INVENTOR(S) : Ethan Dean

It is certified that error appears in the above-identified patent and that said Letters Patent is hereby corrected as shown below:

Column 11,
Line 12, "stet" should read -- 18 --
Line 34, "maybe" should read -- may be --
Line 60, "stet" should be deleted.

Column 19,
Line 7, "partial" should read -- partially --

Signed and Sealed this

Thirteenth Day of July, 2004

JON W. DUDAS
*Acting Director of the United States Patent and Trademark Office*